(12) United States Patent
Wang

(10) Patent No.: US 9,783,664 B1
(45) Date of Patent: *Oct. 10, 2017

(54) HINGED COMPONENT COMPRISING POLYETHYLENE COMPOSITION

(71) Applicant: NOVA Chemicals (International) S.A., Fribourg (CH)

(72) Inventor: XiaoChuan Wang, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/169,787

(22) Filed: Jun. 1, 2016

(51) Int. Cl.
    C08L 23/06 (2006.01)
    C08L 23/08 (2006.01)
    B29C 43/00 (2006.01)
    B29C 43/02 (2006.01)
    B29C 45/00 (2006.01)
    B29L 31/22 (2006.01)

(52) U.S. Cl.
    CPC ........ *C08L 23/0815* (2013.01); *B29C 43/003* (2013.01); *B29C 43/021* (2013.01); *B29C 45/0001* (2013.01); *B29C 2043/022* (2013.01); *B29K 2023/06* (2013.01); *B29L 2031/22* (2013.01); *C08L 2205/025* (2013.01)

(58) Field of Classification Search
    CPC ........... C08L 23/0815; C08L 2207/062; C08L 2205/24; C08L 2203/10; C08L 2205/025; B65D 43/16; B65D 47/0804; B65D 41/04
    See application file for complete search history.

(56) References Cited

U.S. PATENT DOCUMENTS

| | | |
|---|---|---|
| 3,645,992 A | 2/1972 | Elston |
| 4,701,432 A | 10/1987 | Welborn, Jr. |
| 4,798,081 A | 1/1989 | Hazlitt et al. |
| 4,808,561 A | 2/1989 | Welborn, Jr. |
| 4,935,397 A | 6/1990 | Chang |
| 4,937,301 A | 6/1990 | Chang |
| 5,055,438 A | 10/1991 | Canich |
| 5,057,475 A | 10/1991 | Canich et al. |
| 5,064,802 A | 11/1991 | Stevens et al. |
| 5,096,867 A | 3/1992 | Canich |
| 5,132,380 A | 7/1992 | Stevens et al. |
| 5,206,075 A | 4/1993 | Hodgson, Jr. |
| 5,292,845 A | 3/1994 | Kawasaki et al. |
| 5,324,800 A | 6/1994 | Welborn, Jr. et al. |
| 5,342,868 A | 8/1994 | Kimura et al. |
| 5,376,439 A | 12/1994 | Hodgson et al. |
| 5,382,630 A | 1/1995 | Stehling et al. |
| 5,382,631 A | 1/1995 | Stehling et al. |
| 5,494,965 A | 2/1996 | Harlin et al. |
| 5,633,394 A | 5/1997 | Welborn, Jr. et al. |
| 5,703,187 A | 12/1997 | Timmers |
| 5,858,491 A | 1/1999 | Geussens et al. |
| 5,981,636 A | 11/1999 | Amos et al. |
| 5,981,664 A | 11/1999 | Neumann et al. |
| 6,002,033 A | 12/1999 | Razavi et al. |
| 6,034,021 A | 3/2000 | Wilson et al. |
| 6,063,871 A | 5/2000 | Kishine et al. |
| 6,063,879 A | 5/2000 | Stephan et al. |
| 6,114,481 A | 9/2000 | McMeeking et al. |
| 6,194,520 B1 | 2/2001 | Cheruvu et al. |
| 6,235,672 B1 | 5/2001 | McKay et al. |
| 6,277,931 B1 | 8/2001 | Jaber et al. |
| 6,342,463 B1 | 1/2002 | Stephan et al. |
| 6,372,864 B1 | 4/2002 | Brown |
| 6,465,551 B1 | 10/2002 | Zhao et al. |
| 6,489,413 B1 | 12/2002 | Floyd et al. |
| 6,545,093 B1 | 4/2003 | de Lange et al. |
| 6,599,971 B2 | 7/2003 | Dotson et al. |
| 6,642,313 B1 | 11/2003 | Kazakov et al. |
| 6,689,847 B2 | 2/2004 | Mawson et al. |
| 6,777,509 B2 | 8/2004 | Brown et al. |
| 6,806,338 B2 | 10/2004 | Baann et al. |
| 6,809,154 B2 | 10/2004 | Lindahl et al. |
| 6,946,521 B2 | 9/2005 | Miserque et al. |
| 6,984,695 B2 | 1/2006 | Brown et al. |
| 7,022,770 B2 | 4/2006 | Lustiger et al. |

(Continued)

FOREIGN PATENT DOCUMENTS

| | | |
|---|---|---|
| CA | 2 752 407 A1 | 3/2013 |
| EP | 2 017 302 A1 | 1/2009 |

(Continued)

OTHER PUBLICATIONS

ASTM D1525-09; Standard Test Method for Vicat Softening Temperature of Plastics; Copyright ASTM International; 2009; Downloaded Aug. 13, 2012; pp. 1-10.

ASTM D648-07; Standard Test Method for Deflection Temperature of Plastics Under Flexural Load in the Edgewise Position; Copyright ASTM International; Mar. 1, 2007; pp. 1-13.

Wild, L.; Ryle, T.R.; Knobelock, D.C.; and Peat, I.R.; Determination of Branching Distributions in Polyethylene and Ethylene Copolymers; Journal of Polymer Science, Polymer Physics Edition, vol. 20, 1982, pp. 441-455.

Randall, James C; A Review of High Resiluion Liquid Carbon Nuclear Magnetic Resonance Characterizations of Ethylene-Based Polymers; JMS-Rev. Macromol. Chem. Phys., C29(2 & 3), 1989, pp. 201-317.

(Continued)

*Primary Examiner* — Nathan M Nutter

(74) *Attorney, Agent, or Firm* — Julie L. Heinrich

(57) ABSTRACT

A hinged component comprising a polyethylene composition having a molecular weight distribution $M_w/M_n$, of from 2.0 to 7.0; a density of at least 0.949 g/cm³; a melt index, $I_2$ of from greater than 10.0 g/10 min to 20.0 g/10 min, a Z-average molecular weight $M_z$, of less than 300,000; and a melt flow ratio $I_{21}/I_2$, of from 24 to 38; where the hinged component has an average hinge life of more than 4100 cycles.

28 Claims, 5 Drawing Sheets

(56) References Cited

U.S. PATENT DOCUMENTS

| | | | |
|---|---|---|---|
| 7,250,474 | B2 | 7/2007 | Maziers |
| 7,307,126 | B2 | 12/2007 | Lustiger et al. |
| 7,396,878 | B2 | 7/2008 | Lustiger et al. |
| 7,396,881 | B2 | 7/2008 | Lustiger et al. |
| 7,592,395 | B2 | 9/2009 | Poloso |
| 7,700,708 | B2 | 4/2010 | Takahashi et al. |
| 7,750,082 | B2 | 7/2010 | De Cambry De Baudimont et al. |
| 7,750,083 | B2 | 7/2010 | De Cambry De Baudimont et al. |
| 7,790,826 | B2 | 9/2010 | Wilson et al. |
| 7,868,106 | B2 | 1/2011 | Stephenne et al. |
| 7,875,690 | B2 | 1/2011 | Graham et al. |
| 7,928,051 | B2 | 4/2011 | Kipke et al. |
| 8,022,143 | B2 | 9/2011 | Wang |
| 8,039,569 | B2 | 10/2011 | Kipke et al. |
| 8,044,160 | B2 | 10/2011 | Nord-Varhaug et al. |
| 8,129,472 | B2 | 3/2012 | Turner et al. |
| 8,129,489 | B2 | 3/2012 | Okamoto et al. |
| 9,074,082 | B2 | 7/2015 | Wang et al. |
| 9,273,199 | B2 | 3/2016 | Domoy et al. |
| 9,475,927 | B2 * | 10/2016 | Wang et al. ........ C08L 23/0815 |
| 2006/0241256 | A1 | 10/2006 | Baann et al. |
| 2006/0247373 | A1 | 11/2006 | Goyal et al. |
| 2007/0213468 | A1 | 9/2007 | Wilson et al. |
| 2008/0221273 | A1 | 9/2008 | Michie, Jr. et al. |
| 2008/0287608 | A1 | 11/2008 | Nord-Varhaug et al. |
| 2009/0198018 | A1 | 8/2009 | Baeckman et al. |
| 2009/0203848 | A1 | 8/2009 | Gustafsson et al. |
| 2010/0084363 | A1 | 4/2010 | Michie, Jr. et al. |
| 2010/0121006 | A1 | 5/2010 | Cho et al. |
| 2011/0136983 | A1 | 6/2011 | Kapur et al. |
| 2011/0165357 | A1 | 7/2011 | Backman et al. |
| 2012/0022214 | A1 | 1/2012 | Davis et al. |
| 2013/0175194 | A1 * | 7/2013 | Nagpal et al. ........ B65D 65/466 206/524.6 |
| 2013/0331496 | A1 | 12/2013 | Domoy et al. |
| 2013/0343808 | A1 | 12/2013 | Domoy et al. |
| 2014/0275426 | A1 | 9/2014 | Rycroft et al. |
| 2015/0259519 | A1 | 9/2015 | Wang et al. |

FOREIGN PATENT DOCUMENTS

| | | |
|---|---|---|
| WO | 93/03093 A1 | 2/1993 |
| WO | 00/71615 A1 | 11/2000 |
| WO | 2005/121239 A2 | 12/2005 |
| WO | 2007-060007 A1 | 5/2007 |
| WO | 2011/050042 A1 | 4/2011 |
| WO | 2015/042561 A1 | 3/2015 |
| WO | 2015/042562 A1 | 3/2015 |
| WO | 2015/042563 A1 | 3/2015 |

OTHER PUBLICATIONS

Hamielec, Archie E.; MacGregor, John F. and Penlidis; Comprehensive Polymer Science and Supplements; 2. Copolymerization; vol. 3; Publication: 1996, pp. 17-31.

Soares, J.B.P and Hamielec, A.E.; Copolymerization of Olefins in a Series of Continuous Stirred-Tank Slurry-Reactors Using Heterogeneous Ziegler-Natta and Metallocene Catalysts. 1. General Dynamic Mathematical Model; Polymer Reaction Engineering, vol. 4(Issue: 2 & 3), Copyright 1996 by Marcel Dekker, Inc., pp. 153-191.

ASTM D6474-99; Standard Test Method for Determining Molecular Weight Distribution and Molecular Weight Averages of Polyolefins by High Temperature Gel Permeation Chromatography; Copyright by ASTM International; 1999; Downloaded May 21, 2013; pp. 1-6.

ASTM D792-08; Standard Test Methods for Density and Specific Gravity (Relative Density) of Plastics by Displacement; Copyright by ASTM International; 2008; Downloaded Nov. 17, 2011; pp. 1-6.

ASTM D1238-10; Standard Test Method for Melt Flow Rates of Thermoplastics by Extrusion Plastometer; Copyright by ASTM International; 2010; Downloaded Nov. 17, 2011; pp. 1-14.

ASTM D1693-12; Standard Test Method for Environmental Stress-Cracking of Ethylene Plastics; Copyright by ASTM International; 2012; Downloaded Aug. 13, 2012; pp. 1-11.

ASTM D256-10; Standard Test Methods for Determining the Izod Pendulum Impact Resistance of Plastics; Copyright by ASTM International; Current edition approved May 1, 2010; pp. 1-20.

ASTM D6645-01 (Reapproved 2010); Standard Test Method for Methyl (Comonomer) Content in Polyethylene by Infrared Spectrophotometry; Copyright by ASTM International; 2001 and Reapproved 2010; Downloaded Apr. 16, 2013; pp. 1-4.

ASTM D3124-98 (Reapproved 2011); Standard Test Method for Vinylidene Unsaturation in Polyethylene by Infrared Spectrophotometry; Copyright by ASTM International; 1998 and Reapproved 2011; Downloaded Oct. 23, 2013; pp. 1-4.

ASTM D5227-01 (Reapproved 2008); Standard Test Method for Measurement of Hexane Extractable Content of Polyolefins; Copyright by ASTM International; 2001 and Reapproved 2008; Downloaded Aug. 13, 2012; pp. 1-4.

ASTM D790-10; Standard Test Methods for Flexural Properties of Unreinforced and Reinforced Plastics and Electrical Insulating Materials; Copyright by ASTM International; 2010; Downloaded Aug. 13, 2012; pp. 1-11.

ASTM D638-10; Standard Test Method for Tensile Properties of Plastics; Copyright by ASTM International; 2010; Downloaded Jun. 8, 2016; pp. 1-16.

* cited by examiner

US 9,783,664 B1

HINGED COMPONENT COMPRISING POLYETHYLENE COMPOSITION

The present disclosure is directed to hinged components made from polyethylene compositions which comprise a first ethylene copolymer and a second ethylene copolymer. The polyethylene compositions have an optimized set of properties making them particularly suitable for applications in hinged components such as for example hinged closures for bottles.

U.S. Patent Application Publication No. 2014/0275426 discloses a polymer blend comprising a linear low density polyethylene copolymer and a high density polyethylene homopolymer. The blend performed well in polymer bent strip testing.

U.S. Pat. No. 9,273,199 and U.S. Patent Application Publication No. 2013/0343808 disclose that a blend comprising two high density polyethylene components can be injected molded into hinged closures having a hinge performance which is comparable to that of hinges made from polypropylene.

U.S. Pat. No. 9,074,082 discloses polyethylene compositions which are suitable for forming closures having good dimensional stability. U.S. Patent Application Publication No. 2015/0259519 discloses that the same compositions are useful in forming hinged closures.

We now report that hinged components having improved hinge life cycle values can be made using an optimized polyethylene composition having a molecular weight distribution $M_w/M_n$, of from 2.0 to 7.0; a density of at least 0.949 g/cm$^3$; a melt index $I_2$ of from greater than 10.0 g/10 min to 20.0 g/10 min, a Z-average molecular weight $M_Z$, of less than 300,000; and a melt flow ratio $I_{21}/I_2$, of from 24 to 38.

One embodiment of the disclosure is a hinged component comprising a polyethylene composition, the polyethylene composition comprising:

(1) about 10 to about 70 wt % of a first ethylene copolymer having a melt index $I_2$, of from 0.1 to 10 g/10 min; a molecular weight distribution $M_w/M_n$, of less than 3.0; and a density of from 0.930 to 0.960 g/cm$^3$; and (2) about 90 to about 30 wt % of a second ethylene copolymer having a melt index $I_2$, of from 50 to 10,000 g/10 min; a molecular weight distribution $M_w/M_n$, of less than 3.0; and a density higher than the density of the first ethylene copolymer, but less than 0.966 g/cm$^3$;

wherein the density of the second ethylene copolymer is less than 0.037 g/cm$^3$ higher than the density of the first ethylene copolymer; the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 1.0; and wherein the polyethylene composition has a molecular weight distribution $M_w/M_n$, of from 2.0 to 7.0; a density of at least 0.949 g/cm$^3$; a melt index $I_2$ of greater than 10.0 g/10 min to 20.0 g/10 min, a Z-average molecular weight $M_Z$, of less than 300,000; a melt flow ratio $I_{21}/I_2$, of from 24 to 38.

One embodiment of the disclosure is a process for preparing a hinged component wherein the process comprises at least one compression molding or injection molding step and wherein the hinged component comprises a polyethylene composition, the polyethylene composition comprising:

(1) about 10 to about 70 wt % of a first ethylene copolymer having a melt index $I_2$, of from 0.1 to 10 g/10 min; a molecular weight distribution $M_w/M_n$, of less than 3.0; and a density of from 0.930 to 0.960 g/cm$^3$; and (2) about 90 to about 30 wt % of a second ethylene copolymer having a melt index $I_2$, of from 50 to 10,000 g/10 min; a molecular weight distribution $M_w/M_n$, of less than 3.0; and a density higher than the density of the first ethylene copolymer, but less than 0.966 g/cm$^3$;

wherein the density of the second ethylene copolymer is less than 0.037 g/cm$^3$ higher than the density of the first ethylene copolymer; the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 1.0; and wherein the polyethylene composition has a molecular weight distribution $M_w/M_n$, of from 2.0 to 7.0; a density of at least 0.949 g/cm$^3$; a melt index $I_2$ of greater than 10.0 g/10 min to 20.0 g/10 min, a Z-average molecular weight $M_Z$, of less than 300,000; a melt flow ratio $I_{21}/I_2$, of from 24 to 38.

In one embodiment of the disclosure, a hinged component has a hinge life of more than 4200 cycles.

Figure 1:
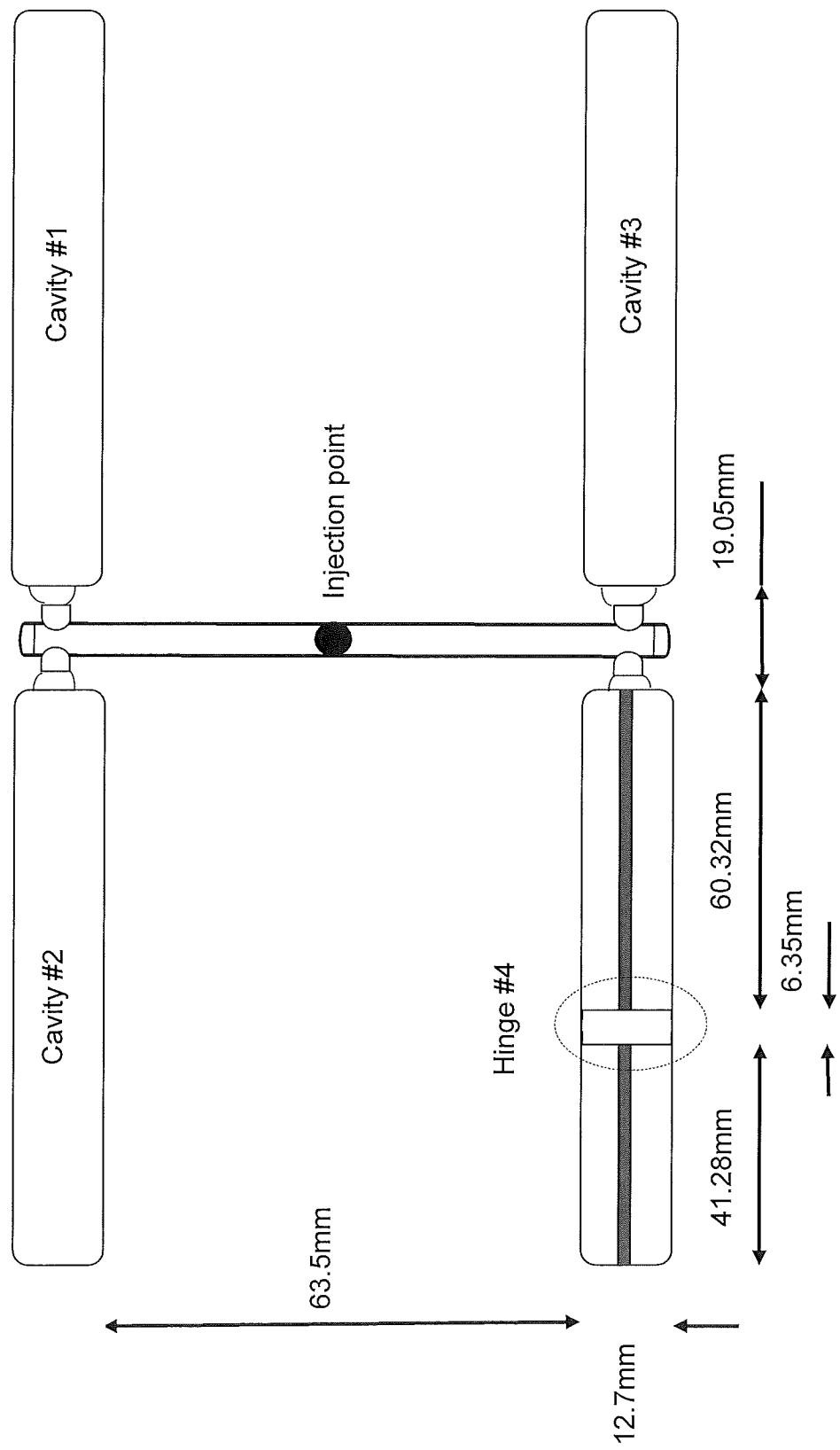
FIG. 1 shows an illustration of a four cavity hinge component mold along with some dimensions of the hinge component, "hinge no. 4". Hinge component, "hinge no. 4" was used for hinge component life cycle testing.

The present disclosure relates to polyethylene compositions that are useful in the manufacture of molded hinged components such as hinged closures.

In an embodiment of the disclosure, the polyethylene compositions are composed of at least two ethylene copolymer components: a first ethylene copolymer and a second ethylene copolymer.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values.

The terms "cap" and "closure" are used interchangeably in the current disclosure, and both connote any suitably shaped molded article for enclosing, sealing, closing or covering etc., a suitably shaped opening, a suitably molded aperture, an open necked structure or the like used in combination with a container, a bottle, a jar and the like.

It is well known that metallocene catalysts and other so called "single site catalysts" generally incorporate comonomer more evenly than traditional Ziegler-Natta catalysts when used for catalytic ethylene copolymerization with alpha olefins. This fact is often demonstrated by measuring the composition distribution breadth index (CDBI) for corresponding ethylene copolymers. The composition distribution of a polymer can be characterized by the short chain distribution index (SCDI) or composition distribution breadth index (CDBI). The definition of composition distribution breadth index (CDBI(50)) can be found in PCT publication WO 93/03093 and U.S. Pat. No. 5,206,075. The CDBI(50) is conveniently determined using techniques which isolate polymer fractions based on their solubility (and hence their comonomer content). For example, temperature rising elution fractionation (TREF) as described by Wild et al. J. Poly. Sci., Poly. Phys. Ed. Vol. 20, p 441, 1982 or in U.S. Pat. No. 4,798,081 can be employed. From the weight fraction versus composition distribution curve, the CDBI(50) is determined by establishing the weight percentage of a copolymer sample that has a comonomer content within 50% of the median comonomer content on each side of the median. Alternatively, the CDBI(25), which is sometimes used in the art, is determined by establishing the weight percentage of a copolymer sample that has a comonomer content within 25% of the median comonomer content on each side of the median.

The First Ethylene Copolymer

In an embodiment of the disclosure, the first ethylene copolymer of the polyethylene composition has a density of from about 0.930 g/cm$^3$ to about 0.960 g/cm$^3$; a melt index, $I_2$, of more than 0.1 g/10 min; a molecular weight distribution, $M_w/M_n$, of below about 3.0 and a weight average molecular weight $M_w$, that is greater than the $M_w$ of the second ethylene copolymer. In one embodiment, the weight average molecular weight $M_w$, of the first ethylene copolymer is at least 50,000 g/mol.

By the term "ethylene copolymer", it is meant that the copolymer comprises both polymerized ethylene and at least one polymerized alpha-olefin comonomer, with polymerized ethylene being the majority species.

In an embodiment of the disclosure, the first ethylene copolymer is made with a single site catalyst, such as, for example, a phosphinimine catalyst.

In an embodiment of the disclosure, the comonomer (i.e., alpha-olefin) content in the first ethylene copolymer is from about 0.05 to about 3.0 mol % as measured by $^{13}$C NMR, or FTIR or GPC-FTIR methods, or as calculated from a reactor model (see the Examples section). The comonomer is one or more suitable alpha olefin, which include, but are not limited to, 1-butene, 1-hexene, 1-octene and the like. In one embodiment the alpha olefin is 1-octene.

In an embodiment of the disclosure, the short chain branching in the first ethylene copolymer is from about 0.25 to about 15 short chain branches per thousand carbon atoms (SCB1/1000Cs). In further embodiments of the disclosure, the short chain branching in the first ethylene copolymer can be from 0.25 to 10, or from 0.25 to 7.5, or from 0.25 to 5, or from 0.25 to 3 branches per thousand carbon atoms (SCB1/1000Cs). The short chain branching is the branching due to the presence of alpha-olefin comonomer in the ethylene copolymer and will for example have two carbon atoms for a 1-butene comonomer, or four carbon atoms for a 1-hexene comonomer, or six carbon atoms for a 1-octene comonomer, etc. The comonomer is one or more suitable alpha-olefin, which include, but are not limited to, 1-butene, 1-hexene, 1-octene and the like. In one embodiment the alpha olefin is 1-octene.

In an embodiment of the disclosure, the comonomer content in the first ethylene copolymer is greater than comonomer content of the second ethylene copolymer (as reported, for example, in mol %).

In an embodiment of the disclosure, the amount of short chain branching in the first ethylene copolymer is greater than the amount of short chain branching in the second ethylene copolymer (as reported in short chain branches, SCB per thousand carbons in the polymer backbone, 1000Cs).

In some embodiments of the disclosure, the melt index, $I_2$ of the first ethylene copolymer can be from 0.1 to 10 g/10 min and including narrower ranges within this range and any numbers encompassed by these ranges. For example, the melt index $I_2$ of the first ethylene composition can be from above 0.1 to below 10 g/10 min, or can be from 0.1 to 7.5 g/10 min, or from 0.1 to 5.0 g/10 min, or from 0.1 to 3.0 g/10 min, or from 0.1 to 2.5 g/10 min, or from 0.1 to 2.0 g/10 min, or from 0.1 to 1.75 g/10 min, or from 0.1 to 1.5 g/10 min, or from 0.1 to 1.0 g/10 min.

In an embodiment of the disclosure, the first ethylene copolymer has a weight average molecular weight $M_w$ of from about 50,000 to about 225,000 g/mol including narrower ranges and any numbers encompassed by these ranges. For example, in another embodiment of the disclosure, the first ethylene copolymer has a weight average molecular weight $M_w$ of from about 75,000 to about 200,000. In further embodiments of the disclosure, the first ethylene copolymer has a weight average molecular weight $M_w$ of from about 75,000 to about 175,000, or from about 85,000 to about 150,000, or from about 100,000 to about 150,000.

In embodiments of the present disclosure, the density of the first ethylene copolymer is from 0.929 to 0.960 g/cm$^3$ or can be a narrower range within this range and any numbers encompassed by these ranges. For example, in further embodiments of the disclosure, the density of the first ethylene copolymer can be from 0.930 to 0.960 g/cm$^3$, or can be from 0.932 to 0.960 g/cm$^3$, or from 0.930 to 0.952 g/cm$^3$, or from 0.932 to 0.952 g/cm$^3$, or from 0.930 to 0.950 g/cm$^3$, or from 0.932 to 0.950 g/cm$^3$, or from 0.930 to 0.948 g/cm$^3$, or from 0.932 to 0.948 g/cm$^3$.

In embodiments of the disclosure, the first ethylene copolymer has a molecular weight distribution $M_w/M_n$ of <3.0, or ≤2.7, or <2.7, or ≤2.5, or <2.5, or ≤2.3, or from 1.8 to 2.3.

In an embodiment of the disclosure, the first ethylene copolymer of the polyethylene composition is produced with a single site catalyst and has a weight average molecular weight $M_w$, of at least 50,000 g/mol; a molecular weight distribution, $M_w/M_n$, of less than 3.0 and a density of from 0.936 to 0.950 g/cm$^3$.

In an embodiment of the disclosure, a single site catalyst which gives an ethylene copolymer having a CDBI(50) of at least 65% by weight, or at least 70%, or at least 75%, or at least 80%, or at least 85%, during solution phase polymerization in a single reactor, is used in the preparation of the first ethylene copolymer.

In an embodiment of the present disclosure, the first ethylene copolymer is ethylene copolymer which has a CDBI(50) of greater than about 60% by weight, or greater than about 65%, or greater than about 70%, or greater than about 75%, or greater than about 80%, or greater than about 85%.

In an embodiment of the disclosure, the first ethylene copolymer comprises from about 10 to about 70 weight percent (wt %) of the total weight of the first and second ethylene copolymers. In an embodiment of the disclosure, the first ethylene copolymer comprises from 20 to about 60 weight percent (wt %) of the total weight of the first and second ethylene copolymers. In an embodiment of the disclosure, the first ethylene copolymer comprises from about 25 to about 60 weight percent (wt %) of the total weight of the first and second ethylene copolymers. In an embodiment of the disclosure, the first ethylene copolymer comprises from about 30 to about 60 weight percent (wt %) of the total weight of the first and second ethylene copolymers. In an embodiment of the disclosure, the first ethylene copolymer comprises from about 40 to about 50 weight percent (wt %) of the total weight of the first and second ethylene copolymers.

The Second Ethylene Copolymer

In an embodiment of the disclosure, the second ethylene copolymer of the polyethylene composition has a density below 0.967 g/cm$^3$ but which is higher than the density of the first ethylene copolymer; a melt index $I_2$, of from about 50 to 10,000 g/10 min; a molecular weight distribution, $M_w/M_n$, of below about 3.0 and a weight average molecular weight $M_w$ that is less than the $M_w$ of the first ethylene copolymer. In one embodiment, the weight average molecular weight, $M_w$ of the second ethylene copolymer will be below 45,000 g/mole.

In an embodiment of the disclosure, the second ethylene copolymer is made with a single site catalyst, such as for example a phosphinimine catalyst.

In an embodiment of the disclosure, the comonomer content in the second ethylene copolymer is from about 0.05 to about 3 mol % as measured by $^{13}$C NMR, or FTIR or GPC-FTIR methods, or as calculated from a reactor model (see Examples section). The comonomer is one or more suitable alpha olefins, which include, but are not limited to, 1-butene, 1-hexene, 1-octene and the like. In one embodiment the alpha olefin is 1-octene.

In an embodiment of the disclosure, the short chain branching in the second ethylene copolymer can be from about 0.10 to about 15 short chain branches per thousand carbon atoms (SCB1/1000Cs). In further embodiments of the disclosure, the short chain branching in the first ethylene copolymer can be from 0.10 to 10, or from 0.10 to 7.5, or from 0.10 to 5, or from 0.15 to 5, or from 0.10 to 3, or from 0.15 to 3, or from 0.20 to 5, or from 0.20 to 3, or from 0.25 to 5, or from 0.25 to 3 branches per thousand carbon atoms (SCB1/10000s). The short chain branching is the branching due to the presence of alpha-olefin comonomer in the ethylene copolymer and will for example have two carbon atoms for a 1-butene comonomer, or four carbon atoms for a 1-hexene comonomer, or six carbon atoms for a 1-octene comonomer, etc. The comonomer is one or more suitable alpha olefin. Examples of alpha olefins include, but are not limited to 1-butene, 1-hexene, 1-octene and the like. In one embodiment the alpha olefin is 1-octene.

In an embodiment of the disclosure, the comonomer content in the second ethylene copolymer is less than the comonomer content of the first ethylene copolymer (as reported for example in mol %).

In an embodiment of the disclosure, the amount of short chain branching in the second ethylene copolymer is less than the amount of short chain branching in the first ethylene copolymer (as reported in short chain branches, SCB per thousand carbons in the polymer backbone, 1000Cs).

In an embodiment of the present disclosure, the density of the second ethylene copolymer is less than 0.968 g/cm$^3$. In another embodiment of the disclosure, the density of the second ethylene copolymer is less than 0.967 g/cm$^3$. In another embodiment of the disclosure, the density of the second ethylene copolymer is less than 0.966 g/cm$^3$. In another embodiment of the disclosure, the density of the second ethylene copolymer is less than 0.965 g/cm$^3$. In an embodiment of the disclosure, the density of the second ethylene copolymer is from 0.952 to 0.967 g/cm$^3$ or can be a narrower range within this range, including all the numbers encompassed within these ranges. In further embodiments, the density of the second ethylene copolymer is from 0.952 to 0.967 g/cm$^3$, or from 0.952 to 0.965 g/cm$^3$, or from 0.953 to 0.965 g/cm$^3$, or from 0.954 to 0.965 g/cm$^3$, or from 0.952 to less than 0.965 g/cm$^3$, or from 0.954 to less than 0.965 g/cm$^3$.

In an embodiment of the present disclosure, the second ethylene copolymer has a density which is higher than the density of the first ethylene copolymer, but less than about 0.037 g/cm$^3$ higher than the density of the first ethylene copolymer. In an embodiment of the disclosure, the second ethylene copolymer has a density which is higher than the density of the first ethylene copolymer, but less than about 0.035 g/cm$^3$ higher than the density of the first ethylene copolymer. In another embodiment of the disclosure, the second ethylene copolymer has a density which is higher than the density of the first ethylene copolymer, but less than about 0.030 g/cm$^3$ higher than the density of the first ethylene copolymer. In still another embodiment of the disclosure, the second ethylene copolymer has a density which is higher than the density of the first ethylene copolymer, but less than about 0.027 g/cm$^3$ higher than the density of the first ethylene copolymer. In still another embodiment of the disclosure, the second ethylene copolymer has a density which is higher than the density of the first ethylene copolymer, but less than about 0.025 g/cm$^3$ higher than the density of the first ethylene copolymer.

In an embodiment of the disclosure, the second ethylene copolymer has a weight average molecular weight $M_w$ of less than 45,000 g/mol. In another embodiment of the disclosure, the second ethylene copolymer has a weight average molecular weight $M_w$ of from about 7,500 to about 40,000. In further embodiments of the disclosure, the second ethylene copolymer has a weight average molecular weight $M_w$ of from about 9,000 to about 35,000, or from about 10,000 to about 30,000, or from about 10,000 to 25,000.

In embodiments of the disclosure, the second ethylene copolymer has a molecular weight distribution ($M_w/M_n$) of <3.0, or ≤2.7, or <2.7, or ≤2.5, or <2.5, or ≤2.3, or from 1.8 to 2.3.

In an embodiment of the disclosure, the melt index $I_2$ of the second ethylene copolymer can be from 50 to 10,000 g/10 min. In another embodiment of the disclosure, the melt index $I_2$ of the second ethylene copolymer can be from 50 to 5,000 g/10 min. In another embodiment of the disclosure, the melt index $I_2$ of the second ethylene copolymer can be from 50 to 2,500 g/10 min. In another embodiment of the disclosure, the melt index $I_2$ of the second ethylene copolymer can be from 100 to 10,000 g/10 min. In yet another embodiment of the disclosure, the melt index $I_2$ of the second ethylene copolymer can be from 100 to 5,000 g/10 min. In yet another embodiment of the disclosure, the melt index $I_2$ of the second ethylene copolymer can be from 100 to 2,500 g/10 min. In yet another embodiment of the disclosure, the melt index $I_2$ of the second ethylene copolymer can be from 100 to 1,500 g/10 min. In yet another embodiment of the disclosure, the melt index $I_2$ of the second ethylene copolymer can be greater than 50, but less than 5,000 g/10 min. In still yet another embodiment of the disclosure, the melt index $I_2$ of the second ethylene copolymer can be greater than 100, but less than 3,000 g/10 min.

In still yet another embodiment of the disclosure, the melt index $I_2$ of the second ethylene copolymer can be greater than 100, but less than 1,500 g/10 min.

In an embodiment of the disclosure, the melt index $I_2$ of the second ethylene copolymer is greater than 50 g/10 min. In an embodiment of the disclosure, the melt index $I_2$ of the second ethylene copolymer is greater than 100 g/10 min. In an embodiment of the disclosure, the melt index $I_2$ of the second ethylene copolymer is greater than 300 g/10 min. In an embodiment of the disclosure, the melt index $I_2$ of the second ethylene copolymer is greater than 500 g/10 min. In an embodiment of the disclosure, the melt index $I_2$ of the second ethylene copolymer is greater than 1,000 g/10 min.

In an embodiment of the disclosure, the second ethylene copolymer of the polyethylene composition is made with a single site catalyst and has a weight average molecular weight, $M_w$, of at most 45,000; a molecular weight distribution, $M_w/M_n$, of less than 3.0 and a density higher than the density of said first ethylene copolymer, but less than 0.967 g/cm$^3$.

In an embodiment of the disclosure, a single site catalyst which gives an ethylene copolymer having a CDBI(50) of at least 65% by weight, or at least 70%, or at least 75%, or at least 80%, or at least 85%, during solution phase polymerization in a single reactor, is used in the preparation of the second ethylene copolymer.

In an embodiment of the present disclosure, the second ethylene copolymer has a CDBI(50) of greater than about 60% by weight, or greater than about 65%, or greater than about 70%, or greater than about 75%, or greater than about 80%, or greater than about 85%.

In an embodiment of the disclosure, the second ethylene copolymer comprises from about 90 to about 30 wt % of the total weight of the first and second ethylene copolymers. In an embodiment of the disclosure, the second ethylene copolymer comprises from about 80 to about 40 wt % of the total weight of the first and second ethylene copolymers. In an embodiment of the disclosure, the second ethylene copolymer comprises from about 75 to about 40 wt % of the total weight of the first and second ethylene copolymers. In an embodiment of the disclosure, the second ethylene copolymer comprises from about 70 to about 40 wt % of the total weight of the first and second ethylene copolymers. In an embodiment of the disclosure, the second ethylene copolymer comprises from about 60 to about 50 wt % of the total weight of the first and second ethylene copolymers.

In embodiments of the disclosure, the melt index $I_2$ of the second ethylene copolymer is at least 50 times, or at least 100 times, or at least 1,000 times the melt index $I_2$ of the first ethylene copolymer.

The Polyethylene Composition

In one embodiment the polyethylene composition will contain a first ethylene copolymer and a second ethylene copolymer (as defined herein).

In some embodiments of the disclosure, the polyethylene composition has a unimodal, broad unimodal, bimodal or multimodal molecular weight distribution as determined by gel permeation chromatography.

In an embodiment of the disclosure, the polyethylene composition that comprises a first ethylene copolymer and a second ethylene copolymer (as defined above) will have a ratio (SCB1/SCB2) of the number of short chain branches per thousand carbon atoms in the first ethylene copolymer (i.e., SCB1) to the number of short chain branches per thousand carbon atoms in the second ethylene copolymer (i.e., SCB2) of greater than 1.0 (i.e., SCB1/SCB2>1.0).

In further embodiments of the disclosure, the ratio of the short chain branching in the first ethylene copolymer (SCB1) to the short chain branching in the second ethylene copolymer (SCB2) is at least 1.25. In still another embodiment of the disclosure, the ratio of the short chain branching in the first ethylene copolymer (SCB1) to the short chain branching in the second ethylene copolymer (SCB2) is at least 1.5.

In embodiments of the disclosure, the ratio (SCB1/SCB2) of the short chain branching in the first ethylene copolymer (SCB1) to the short chain branching in the second ethylene copolymer (SCB2) will be from greater than 1.0 to about 12.0, or from greater than 1.0 to about 10, or from greater than 1.0 to about 7.0, or from greater than 1.0 to about 5.0, or from greater than 1.0 to about 3.0.

In an embodiment of the disclosure, the polyethylene composition is bimodal as determined by gel permeation chromatography (GPC).

A bimodal or multimodal polyethylene composition can be identified by using gel permeation chromatography (GPC). A GPC chromatograph may exhibit two or more component ethylene copolymers, where the number of component ethylene copolymers corresponds to the number of discernible peaks. One or more component ethylene copolymers may also exist as a hump, shoulder or tail relative to the molecular weight distribution of the other ethylene copolymer component. By the phrase "bimodal as determined by GPC", it is meant that in addition to a first peak, there will be a secondary peak or shoulder which represents a higher or lower molecular weight component (i.e., the molecular weight distribution, can be said to have two maxima in a molecular weight distribution curve). Alternatively, the phrase "bimodal as determined by GPC" connotes the presence of two maxima in a molecular weight distribution curve generated according to the method of ASTM D6474-99.

In an embodiment of the disclosure, the polyethylene composition has a density of greater than or equal to 0.949 g/cm$^3$, as measured according to ASTM D792; a melt index $I_2$, of from greater than 10 g/10 min to about 20 g/10 min, as measured according to ASTM D1238 (when conducted at 190° C., using a 2.16 kg weight); a molecular weight distribution, $M_w/M_n$, of from about 2.0 to about 7.0, a melt flow ratio $I_{21}/I_2$, of from 24 to 38, and a Z-average molecular weight $M_z$, of less than about 300,000.

In embodiments of the disclosure, the polyethylene composition has a comonomer content of less than about 0.75 mol %, or less than about 0.70 mol %, or less than about 0.65 mol %, or less than about 0.60 mol %, or less than about 0.55 mol %, or less than about 0.50 mol % as measured by FTIR or $^{13}C$ NMR methods, where the comonomer is one or more suitable alpha olefins, which include, but are not limited to, 1-butene, 1-hexene, 1-octene and the like. In one embodiment the alpha olefin is 1-octene.

In an embodiment of the present disclosure, the polyethylene composition has a density of at least 0.949 g/cm$^3$. In further embodiments of the disclosure, the polyethylene composition has a density of >0.950 g/cm$^3$, or >0.951 g/cm$^3$, or >0.952 g/cm$^3$, or >0.953 g/cm$^3$, or >0.955 g/cm$^3$.

In an embodiment of the disclosure, the polyethylene composition has a density in the range of 0.949 to 0.970 g/cm$^3$. In an embodiment of the disclosure, the polyethylene composition has a density in the range of 0.950 to 0.970 g/cm$^3$. In an embodiment of the current disclosure, the polyethylene composition has a density in the range of 0.949 to 0.965 g/cm$^3$. In an embodiment of the current disclosure, the polyethylene composition has a density in the range of 0.950 to 0.965 g/cm$^3$. In an embodiment of the disclosure, the polyethylene composition has a density in the range of 0.949 to 0.962 g/cm$^3$. In an embodiment of the disclosure, the polyethylene composition has a density in the range of 0.950 to 0.962 g/cm$^3$. In an embodiment of the disclosure, the polyethylene composition has a density in the range of 0.949 to 0.960 g/cm$^3$. In an embodiment of the disclosure, the polyethylene composition has a density in the range of 0.950 to 0.960 g/cm$^3$. In an embodiment of the disclosure, the polyethylene composition has a density in the range of 0.949 to 0.959 g/cm$^3$. In an embodiment of the disclosure, the polyethylene composition has a density in the range of 0.950 to 0.959 g/cm$^3$.

In an embodiment of the disclosure, the polyethylene composition has a melt index $I_2$, of from greater than 10 g/10 min to 22 g/10 min according to ASTM D1238 (when conducted at 190° C., using a 2.16 kg weight) and including narrower ranges within this range and all numbers encompassed by these ranges. For example, in further embodiments of the disclosure, the polyethylene composition has a melt index $I_2$, of greater than 10 g/10 min, but less than 22 g/10 min, or from greater than 10 g/10 min to 20.0 g/10 min, or from 10.5 g/10 min to 19.0 g/10 min, or from 10.5 g/10 min to 18.5 g/10 min, or from 10.5 g/10 min to 18.0 g/10 min.

In an embodiment of the disclosure, the polyethylene composition has a "high load" melt index $I_{21}$ of at least about 150 g/10 min according to ASTM D1238 (when conducted at 190° C., using a 21 kg weight). In another embodiment of the disclosure, the polyethylene composition has a high load melt index $I_{21}$, of greater than about 200 g/10 min. In another embodiment of the disclosure, the polyethylene composition has a high load melt index $I_{21}$, of greater than about 250 g/10 min. In another embodiment of the disclosure, the polyethylene composition has a high load melt index $I_{21}$, of greater than about 300 g/10 min.

In an embodiment of the disclosure, the polyethylene composition has a high load melt index $I_{21}$, of from 150 to 750 g/10 min, or from 200 to 750 g/10 min, or from 250 to 750 g/10 min, or from 300 to 800 g/10 min, or from 300 to 750 g/10 min.

In an embodiment of the disclosure, the polyethylene composition has a number average molecular weight $M_n$, of below about 30,000 g/mol. In another embodiment of the disclosure, the polyethylene composition has a number average molecular weight $M_n$, of below about 25,000 g/mol. In yet another embodiment of the disclosure, the polyethylene composition has a number average molecular weight $M_n$, of below about 20,000 g/mol.

In the present disclosure, the polyethylene composition has a molecular weight distribution $M_w/M_n$, of from 2.0 to 7.0 or a narrower range within this range, including all the numbers encompassed within these ranges. For example, in further embodiments of the disclosure, the polyethylene composition has molecular weight distribution $M_w/M_n$, of from 2.5 to 7.0, or from 2.0 to 6.0, or from 2.0 to 5.5, or from 2.0 to 5.0, or from 2.0 to 4.5, or from 2.0 to 4.0, or from 2.5 to 4.5, or from 2.5 to 4.0, or from 2.5 to 3.5, or from 3.0 to 5.5, or from 3.0 to 5.0, or from 3.0 to 4.5, or from 3.0 to 4.0.

In an embodiment of the disclosure, the polyethylene composition has a Z-average molecular weight, $M_Z$, of below about 300,000 g/mole. In another embodiment of the disclosure, the polyethylene composition has a Z-average molecular weight, $M_Z$, of below about 250,000 g/mole. In yet another embodiment of the disclosure, the polyethylene composition has a Z-average molecular weight, $M_Z$, of below about 200,000 g/mole. In yet another embodiment of the disclosure, the polyethylene composition has a Z-average molecular weight, $M_Z$, of below about 150,000 g/mole.

In embodiments of the disclosure, the polyethylene composition has a ratio of Z-average molecular weight to weight average molecular weight $M_Z/M_w$, of from 2.0 to 4.0, or from 2.0 to 3.75, or from 2.25 to 3.75, or from 2.0 to 3.5, or from 2.0 to 3.25, or from 2.0 to 3.0, or from 2.0 to 2.75.

In embodiments of the disclosure, the polyethylene composition has a melt flow ratio defined as $I_{21}/I_2$, of less than 41, or less than 40, or less than 38, or less than 36, or less than 34.

In embodiments of the disclosure, the polyethylene composition has a melt flow ratio defined as $I_{21}/I_2$, of from about 22 to about 40, or from about 22 to 38, or from 24 to 38, of from 24 to 40, or from about 24 to 36, or from 22 to 36, or from 24 to 34, or from 24 to 35.

In an embodiment of the disclosure, the polyethylene composition has a shear viscosity at about $10^5$ s$^{-1}$ (240° C.) of less than about 10 (Pa·s). In further embodiments of the disclosure, the polyethylene composition has a shear viscosity at about $10^5$ s$^{-1}$ (240° C.) of less than 7.5 Pa·s. In embodiments of the disclosure, the polyethylene composition has a shear viscosity at about 100 s$^{-1}$ (240° C.) of less than about 600 Pa·s, a shear viscosity at about 200 s$^{-1}$ (240° C.) of less than about 500 Pa·s and a shear viscosity at about 300 s$^{-1}$ (240° C.) of less than about 400 Pa·s.

In an embodiment of the disclosure, the polyethylene composition has at least one type of alpha-olefin that has at least 4 carbon atoms and its content is less than about 0.75 mol % as determined by $^{13}$C NMR. In an embodiment of the disclosure, the polyethylene composition has at least one type of alpha-olefin that has at least 4 carbon atoms and its content is less than about 0.65 mol % as determined by $^{13}$C NMR. In an embodiment of the disclosure, the polyethylene composition has at least one type of alpha-olefin that has at least 4 carbon atoms and its content is less than about 0.55 mol % as determined by $^{13}$C NMR. In an embodiment of the disclosure, the polyethylene composition has at least one type of alpha-olefin that has at least 4 carbon atoms and its content is less than about 0.50 mol % as determined by $^{13}$C NMR. In an embodiment of the disclosure, the polyethylene composition has at least one type of alpha-olefin that has at least 4 carbon atoms and its content is greater than about 0.20 to less than about 0.55 mol % as determined by $^{13}$C NMR.

In an embodiment of the disclosure, the shear viscosity ratio, SVR$_{(100,100000)}$ at 240° C. of the polyethylene composition can be from about 30 to about 70, or can be from about 30 to about 60, or from about 30 to about 55, or from about 30 to about 50. The shear viscosity ratio SVR$_{(100, 100000)}$ is determined by taking the ratio of shear viscosity at shear rate of 100 s$^{-1}$ and shear viscosity at shear rate of 100000 s$^{-1}$ as measured with a capillary rheometer at constant temperature (e.g., 240° C.), and two dies with L/D ratio of 20 and diameter of 0.06" (from about 3 to 1000 s$^{-1}$) and L/D ratio of 20 and diameter of 0.012" (from about 1000 to 100000 s$^1$) respectively.

In an embodiment of the disclosure, the polyethylene composition or a molded article made from the polyethylene composition, has an environment stress crack resistance ESCR Condition B at 100% of at least about 1 hour (hr), as measured according to ASTM D1693 (at 50° C. using 100% Igepal, condition B).

In an embodiment of the disclosure, the polyethylene composition or a molded article made from the polyethylene composition, has an environment stress crack resistance ESCR Condition B at 100% of at least about 2 hours, as measured according to ASTM D1693 (at 50° C. using 100% Igepal, condition B).

In an embodiment of the disclosure, the polyethylene composition or a molded article made from the polyethylene composition, has an environment stress crack resistance ESCR Condition B at 100% of from about 1 to about 15 hours, as measured according to ASTM D1693 (at 50° C. using 100% Igepal, condition B).

In an embodiments of the disclosure, the polyethylene composition or a molded article made from the polyethylene composition has a notched Izod impact strength of at least about 30 J/m, or at least about 35 J/m as measured according to ASTM D256.

In an embodiment of the disclosure, the polyethylene composition has a hexanes extractables of less than about 0.55%. In further embodiments of the disclosure, the polyethylene composition has a hexanes extractables of less than about 0.50%, or less than about 0.45%, or less than about 0.40%, or less than about 0.35%.

In an embodiment of the disclosure, the polyethylene composition has a stress exponent, defined as $Log_{10}[I_{16}/I_2]/Log_{10}[6.48/2.16]$, which is ≤1.40. In further embodiments of the disclosure, the polyethylene composition has a stress exponent, $Log_{10}[I_{16}/I_2]/Log_{10}[6.48/2.16]$ of from 1.22 to 1.40, or from 1.22 to 1.38, or from 1.24 to 1.36.

In an embodiment of the disclosure, the polyethylene composition has a composition distribution breadth index (CDBI(50)), as determined by temperature elution fractionation (TREF), of ≥about 60 weight percent. In further embodiments of the disclosure, the polyethylene composition will have a CDBI(50) of greater than about 65% by weight, or greater than about 70%, or greater than about 75%, or greater than about 80%, or greater than about 85%.

In an embodiment of the disclosure, the polyethylene composition has a composition distribution breadth index (CDBI(25)), as determined by temperature elution fractionation (TREF), of ≥about 50 weight percent. In further embodiments of the disclosure, the polyethylene composition will have a CDBI(25) of greater than about 55% by weight, or greater than about 60% by weight, or greater than about 65%, or from about 55 to about 75%, or from about 60 to about 75%.

The polyethylene composition of this disclosure can be made using any conventional blending method such as but not limited to physical blending and in-situ blending by polymerization in multi reactor systems. For example, it is possible to perform the mixing of the first ethylene copolymer with the second ethylene copolymer by molten mixing of the two preformed polymers. One embodiment uses processes in which the first and second ethylene copolymers are prepared in at least two sequential polymerization stages, however, either in-series or in-parallel dual reactor processes are contemplated for use in the current disclosure. Gas phase, slurry phase or solution phase reactor systems may be used. In one embodiment a solution phase reactor systems is used.

Mixed catalyst single reactor systems may also be employed to make the polymer compositions of the present disclosure.

In an embodiment of the current disclosure, a dual reactor solution polymerization process is used as has been described in for example U.S. Pat. No. 6,372,864 and U.S. Patent Application No. 20060247373A1 which are incorporated herein by reference.

In some embodiments the catalysts used in the current disclosure will be so called single site catalysts based on a group 4 metal having at least one cyclopentadienyl ligand. Examples of such catalysts include metallocenes, constrained geometry catalysts and phosphinimine catalysts used, for example, in combination with activators selected from methylaluminoxanes, boranes or ionic borate salts and are further described in U.S. Pat. Nos. 3,645,992; 5,324,800; 5,064,802; 5,055,438; 6,689,847; 6,114,481 and 6,063,879. Such single site catalysts are distinguished from traditional Ziegler-Natta or Phillips catalysts which are also well known in the art. In general, single site catalysts produce ethylene copolymers having a molecular weight distribution ($M_w/M_n$) of less than about 3.0 and a composition distribution breadth index CDBI(50) of greater than about 65%.

In an embodiment of the disclosure, a single site catalyst is used to make an ethylene copolymer having a CDBI(50) of at least about 65% by weight, or at least about 70%, or at least about 75%, or at least about 80%, or at least about 85%, during solution phase polymerization in a single reactor, for the preparation of each of the first and the second ethylene copolymers.

In an embodiment of the disclosure, homogeneously branched ethylene copolymers are prepared using an organometallic complex of a group 3, 4 or 5 metal that is further characterized as having a phosphinimine ligand. Such a complex, when active toward olefin polymerization, is known generally as a phosphinimine (polymerization) catalyst. Some non-limiting examples of phosphinimine catalysts can be found in U.S. Pat. Nos. 6,342,463; 6,235,672; 6,372,864; 6,984,695; 6,063,879; 6,777,509 and 6,277,931 all of which are incorporated by reference herein.

Some non-limiting examples of metallocene catalysts can be found in U.S. Pat. Nos. 4,808,561; 4,701,432; 4,937,301; 5,324,800; 5,633,394; 4,935,397; 6,002,033 and 6,489,413, which are incorporated herein by reference. Some non-limiting examples of constrained geometry catalysts can be found in U.S. Pat. Nos. 5,057,475; 5,096,867; 5,064,802; 5,132,380; 5,703,187 and 6,034,021, all of which are incorporated by reference herein in their entirety.

In an embodiment of the disclosure, use of a single site catalyst that does not produce long chain branching (LCB) is used. Hexyl (C6) branches detected by NMR are excluded from the definition of a long chain branch in the present disclosure.

Without wishing to be bound by any single theory, long chain branching can increase viscosity at low shear rates, thereby negatively impacting cycle times during the manufacture of caps and closures, such as during the process of compression molding. Long chain branching may be determined using $^{13}C$ NMR methods and may be quantitatively assessed using the method disclosed by Randall in Rev. Macromol. Chem. Phys. C29 (2 and 3), p. 285.

In an embodiment of the disclosure, the polyethylene composition will contain fewer than 0.3 long chain branches per 1000 carbon atoms. In another embodiment of the disclosure, the polyethylene composition will contain fewer than 0.01 long chain branches per 1000 carbon atoms.

In an embodiment of the disclosure, the polyethylene composition is prepared by contacting ethylene and at least one alpha-olefin with a polymerization catalyst under solution phase polymerization conditions in at least two polymerization reactors (for an example of solution phase polymerization conditions see for example U.S. Pat. Nos. 6,372,864 and 6,984,695 and U.S. Patent Application Publication No. 20060247373A1 which are incorporated herein by reference).

In an embodiment of the disclosure, the polyethylene composition is prepared by contacting at least one single site polymerization catalyst system (comprising at least one single site catalyst and at least one activator) with ethylene and a least one comonomer (e.g., a C3-C8 alpha-olefin) under solution polymerization conditions in at least two polymerization reactors.

In an embodiment of the disclosure, a group 4 single site catalyst system, comprising a single site catalyst and an activator, is used in a solution phase dual reactor system to prepare a polyethylene composition by polymerization of ethylene in the presence of an alpha-olefin comonomer.

In an embodiment of the disclosure, a group 4 single site catalyst system, comprising a single site catalyst and an activator, is used in a solution phase dual reactor system to prepare a polyethylene composition by polymerization of ethylene in the presence of 1-octene.

In an embodiment of the disclosure, a group 4 phosphinimine catalyst system, comprising a phosphinimine catalyst and an activator, is used in a solution phase dual reactor system to prepare a polyethylene composition by polymerization of ethylene in the presence of an alpha-olefin comonomer.

In an embodiment of the disclosure, a group 4 phosphinimine catalyst system, comprising a phosphinimine catalyst and an activator, is used in a solution phase dual reactor system to prepare a polyethylene composition by polymerization of ethylene in the presence of 1-octene.

In an embodiment of the disclosure, a solution phase dual reactor system comprises two solution phase reactors connected in series.

In an embodiment of the disclosure, a polymerization process to prepare the polyethylene composition comprises contacting at least one single site polymerization catalyst system (comprising at least one single site catalyst and at least one activator) with ethylene and at least one alpha-olefin comonomer under solution polymerization conditions in at least two polymerization reactors.

In an embodiment of the disclosure, a polymerization process to prepare the polyethylene composition comprises contacting at least one single site polymerization catalyst system with ethylene and at least one alpha-olefin comonomer under solution polymerization conditions in a first reactor and a second reactor configured in series.

In an embodiment of the disclosure, a polymerization process to prepare the polyethylene composition comprises contacting at least one single site polymerization catalyst system with ethylene and at least one alpha-olefin comonomer under solution polymerization conditions in a first reactor and a second reactor configured in series, with the at least one alpha-olefin comonomer being fed exclusively to the first reactor.

In an embodiment of the disclosure, homogeneously branched ethylene copolymers are prepared using an organometallic complex of a group 3, 4 or 5 metal that is further characterized as having a phosphinimine ligand. Such a complex, when active toward olefin polymerization, is known generally as a phosphinimine (polymerization) catalyst.

In one embodiment, the production of the polyethylene composition of the present disclosure may include an extrusion or compounding step. Such steps are well known in the art.

In one embodiment, the polyethylene composition can comprise further polymer components in addition to the first and second ethylene polymers. Such polymer components include polymers made in situ or polymers added to the polymer composition during an extrusion or compounding step.

Optionally, additives can be added to the polyethylene composition. Additives can be added to the polyethylene composition during an extrusion or compounding step, but other suitable known methods will be apparent to a person skilled in the art. The additives can be added as is or as part of a separate polymer component (i.e. not the first or second ethylene polymers described above) added during an extrusion or compounding step. Suitable additives are known in the art and include but are not-limited to antioxidants, phosphites and phosphonites, nitrones, antacids, UV light stabilizers, UV absorbers, metal deactivators, dyes, fillers and reinforcing agents, nano-scale organic or inorganic materials, antistatic agents, lubricating agents such as calcium stearates, slip additives such as erucimide or behenamide, and nucleating agents (including nucleators, pigments or any other chemicals which may provide a nucleating effect to the polyethylene composition). The additives that can be optionally added may be added in amount of up to about 20 weight percent (wt %).

One or more nucleating agent(s) may be introduced into the polyethylene composition by kneading a mixture of the polymer, usually in powder or pellet form, with the nucleating agent, which may be utilized alone or in the form of a concentrate containing further additives such as stabilizers, pigments, antistatics, UV stabilizers and fillers. In an embodiment of the disclosure, the nucleating agent is a material which is wetted or absorbed by the polymer, which is insoluble in the polymer, has a melting point higher than that of the polymer, and it is homogeneously dispersible in the polymer melt in as fine a form as possible (about 1 to about 10 μm). Compounds known to have a nucleating capacity for polyolefins include salts of aliphatic monobasic or dibasic acids or arylalkyl acids, such as sodium succinate or aluminum phenylacetate; and alkali metal or aluminum salts of aromatic or alicyclic carboxylic acids such as sodium β-naphthoate. Another compound known to have nucleating capacity is sodium benzoate. The effectiveness of nucleation may be monitored microscopically by observation of the degree of reduction in size of the spherulites into which the crystallites are aggregated.

Examples of nucleating agents which are commercially available and which may be added to the polyethylene composition are dibenzylidene sorbital esters (such as the products sold under the trademark Millad™3988 by Milliken Chemical and Irgacleamm by Ciba Specialty Chemicals). Further examples of nucleating agents which may added to the polyethylene composition include the cyclic organic structures disclosed in U.S. Pat. No. 5,981,636 (and salts thereof, such as disodium bicyclo [2.2.1] heptene dicarboxylate); the saturated versions of the structures disclosed in U.S. Pat. No. 5,981,636 (as disclosed in U.S. Pat. No. 6,465,551; Zhao et al., to Milliken); the salts of certain cyclic dicarboxylic acids having a hexahydrophtalic acid structure (or "HHPA" structure) as disclosed in U.S. Pat. No. 6,599,971 (Dotson et al., to Milliken); and phosphate esters, such as those disclosed in U.S. Pat. No. 5,342,868 and those sold under the trade names NA-11 and NA-21 by Asahi Denka Kogyo, cylic dicarboxylates and the salts thereof, such as the divalent metal or metalloid salts, (particularly, calcium salts) of the HHPA structures disclosed in U.S. Pat. No. 6,599,971. For clarity, the HHPA structure comprises a ring structure with six carbon atoms in the ring and two carboxylic acid groups which are substituents on adjacent atoms of the ring structure. The other four carbon atoms in the ring may be substituted, as disclosed in U.S. Pat. No. 6,599,971. An example is 1,2-cyclohexanedicarboxylicacid, calcium salt (CAS registry number 491589-22-1). Still further examples of nucleating agents which may added to the polyethylene composition include those disclosed in WO2015042561, WO2015042563, WO2015042562 and WO 2011050042.

Many of the above described nucleating agents may be difficult to mix with the polyethylene composition that is being nucleated and it is known to use dispersion aids, such as for example, zinc stearate, to mitigate this problem.

In an embodiment of the disclosure, the nucleating agents are well dispersed in the polyethylene composition.

In an embodiment of the disclosure, the amount of nucleating agent used is comparatively small (from 100 to 3000 parts by million per weight (based on the weight of the polyethylene composition)) so it will be appreciated by those skilled in the art that some care must be taken to ensure that the nucleating agent is well dispersed. In an embodiment of the disclosure, the nucleating agent is added in finely divided form (less than 50 microns, especially less than 10 microns) to the polyethylene composition to facilitate mixing. This type of "physical blend" (i.e., a mixture of the nucleating agent and the resin in solid form) is, in some embodiments, preferable to the use of a "masterbatch" of the nucleator (where the term "masterbatch" refers to the practice of first melt mixing the additive—the nucleator, in this case—with a small amount of the polyethylene composition resin—then melt mixing the "masterbatch" with the remaining bulk of the polyethylene composition resin).

In an embodiment of the disclosure, an additive such as nucleating agent may be added to the polyethylene composition by way of a "masterbatch", where the term "masterbatch" refers to the practice of first melt mixing the additive (e.g., a nucleator) with a small amount of the polyethylene composition, followed by melt mixing the "masterbatch" with the remaining bulk of the polyethylene composition.

In an embodiment of the disclosure, the polymer composition further comprises a nucleating agent or a mixture of nucleating agents.

In an embodiment of the disclosure, the polyethylene compositions described above are used in the formation of molded articles having a hinge (so called "hinged components"). For example, articles formed by continuous compression molding and injection molding are contemplated. Such articles include hinged components such as caps and closures for bottles, containers and the like. However, a person skilled in the art will readily appreciate that the compositions described above may also be used for other applications such as but not limited to film, injection blow molding, blow molding and sheet extrusion applications.

In an embodiment of the disclosure, the polyethylene compositions described above are used in the formation of hinged closure for bottles, containers and the like. For example, hinged closures for bottles formed by compression molding or injection molding are contemplated. Hinged components include, for example, hinged caps, hinged screw caps, hinged snap-top caps, and hinged closures for bottles, containers and the like.

In an embodiment of the disclosure, a closure (or cap) comprises a hinge made of the same material as the rest of the closure (or cap).

In an embodiment of the disclosure, a closure (or cap) is hinged closure.

In an embodiment of the disclosure, a closure (or cap) is a hinged closure for bottles, containers and the like.

In an embodiment of the disclosure, a closure (or cap) is a flip-top hinge closure, such as a flip-top hinge closure for use on a plastic ketchup bottle or similar containers containing foodstuffs.

When a closure is a hinged closure, it comprises a hinged component and generally consists of at least two bodies which are connected by a thinner section that acts as a hinge allowing the at least two bodies to bend from an initially molded position. The thinner section may be continuous or web-like, wide or narrow.

A useful closure (for bottles, containers and the like) is a hinged closure and may consist of two bodies joined to each other by at least one thinner bendable portion (e.g. the two bodies can be joined by a single bridging portion, or more than one bridging portion, or by a webbed portion, etc.). A first body may contain a dispensing hole and which may snap onto or screw onto a container to cover a container opening (e.g. a bottle opening) while a second body may serve as a snap on lid which may mate with the first body.

The caps and closures, of which hinged caps and closures are a subset, can be made according to any known method, including for example injection molding and continuous compression molding techniques that are well known to persons skilled in the art. Hence, in an embodiment of the disclosure a closure (or cap) comprising the polyethylene composition (defined above) is prepared with a process comprising at least one compression molding step and/or at least one injection molding step.

Hinged closures and caps are well suited for sealing bottles, containers and the like, for examples bottles that may contain drinkable water, and other foodstuffs, including but not limited to liquids that are non-pressurized. The hinged closures and caps may also be used for sealing bottles containing drinkable water or non-carbonated beverages (e.g. juice). Other applications, include hinged caps and closures for bottles and containers containing foodstuffs, such as for example ketchup bottles and the like.

The Hinged Component

In an embodiment of the disclosure, the polyethylene compositions described herein are used in the formation of a hinged component.

The hinged component can be a part of a cap or closure or it can be a cap or closure per se.

The hinged component, can be made according to any known method, including for example injection molding and compression molding techniques that are well known to persons skilled in the art. Hence, in an embodiment of the disclosure a hinged component comprising the polyethylene composition defined herein is prepared with a process comprising at least one compression molding step and/or at least one injection molding step.

In an embodiment of the disclosure, the polyethylene compositions described herein are used in a process to make a hinged component. Such processes include, for example, compression molding (or continuous compression molding) and injection molding.

A hinged component is a component consisting of at least two bodies which are connected to one another through a flexible hinge. The flexible hinge may be a continuous, partial or segmented section (which is typically thinner than the two or more bodies), so as to act as a fulcrum or pivot point about which the two or more bodies may bend. For example the two or more bodies may bend about the flexible hinge from a molded position into a flexed position.

Examples of hinged components include caps or closures having a single strap, dual strap, multi strap or butterfly strap designs such as, for example, those shown in U.S. Pat. Appl. Pub. No. 2013/0343808 (see for example FIGS. 3 to 13 therein).

Another example of a hinged component is provided in U.S. Patent Application Publication No. 2014/0275426.

In an embodiment of the disclosure the hinged component is a hinged cap or closure, or the like for bottles, containers and the like.

Caps and closures may be formed by continuous compression molding or by injection molding. Such closures include, for example, hinged caps, hinged screw caps, hinged snap-top caps, and hinged closures for bottles, containers and the like.

In an embodiment of the disclosure, a hinged component is a closure (or cap) comprising a hinge made of the same material as the rest of the closure (or cap).

In an embodiment of the disclosure, a hinged component is a hinged closure (or cap).

In an embodiment of the disclosure, a hinged component is a hinged closure (or cap) for bottles, containers and the like.

In an embodiment of the disclosure, a hinged component is a flip-top hinge closure, such as a flip-top hinge closure for use on a plastic ketchup bottle or similar containers containing foodstuffs.

When a closure is a hinged closure, it may comprise a hinged component and generally consists of at least two bodies which are connected by a thinner section that acts as a hinge allowing the at least two bodies to bend from an initially molded position. The thinner section may be continuous or web-like, wide or narrow.

A useful hinged component is a hinged closure (for bottles, containers and the like) and may consist of two bodies joined to each other by at least one thinner bendable portion (e.g. the two bodies can be joined by a single bridging portion, or more than one bridging portion, or by a webbed portion, etc.). A first body may contain a dispensing hole and which may snap onto or screw onto a container to cover a container opening (e.g., a bottle opening) while a second body may serve as a snap on lid which may mate with the first body.

Hinged caps and closures can be made according to any known method, including for example injection molding and compression molding techniques that are well known to persons skilled in the art. Hence, in an embodiment of the disclosure a closure (or cap) comprising the polyethylene composition is prepared with a process comprising at least one continuous compression molding step and/or at least one injection molding step.

The hinged closures and caps of this disclosure may be used for sealing bottles, containers and the like, for example, bottles that may contain drinkable water, and other foodstuffs, including but not limited to liquids that are non-pressurized. The hinged closures and caps may also be used for sealing bottles containing drinkable water or non-carbonated beverages (e.g., juice). Other applications, include hinged caps and closures for bottles and containers containing foodstuffs, such as for example ketchup bottles and the like.

In an embodiment of the present disclosure, a hinged component has an average hinge life of at least 4100 cycles.

In an embodiment of the present disclosure, a hinged component has an average hinge life of at least 4200 cycles.

In an embodiment of the present disclosure, a hinged component has an average hinge life of at least 4500 cycles.

In an embodiment of the present disclosure, a hinged component has an average hinge life of at least 4800 cycles.

In an embodiment of the present disclosure, a hinged component has an average hinge life of at least 5000 cycles.

In an embodiment of the present disclosure, a hinged component has an average hinge life of from about 4200 cycles to about 15,000 cycles.

In an embodiment of the present disclosure, a hinged component has an average hinge life of from about 4200 cycles to about 10,000 cycles.

In an embodiment of the present disclosure, a hinged component has an average hinge life of from about 4500 cycles to about 15,000 cycles.

In an embodiment of the present disclosure, a hinged component has an average hinge life of from about 4500 cycles to about 10,000 cycles.

The disclosure is further illustrated by the following non-limiting examples.

EXAMPLES

Melt indexes, $I_2$, $I_5$, $I_6$ and $I_{21}$ for the polyethylene composition were measured according to ASTM D1238 (when conducted at 190° C., using a 2.16 kg, a 5 kg, a 6.48 kg and a 21 kg weight respectively).

$M_n$, $M_w$, and $M_z$ (g/mol) were determined by high temperature Gel Permeation Chromatography with differential refractive index detection using universal calibration (e.g. ASTM-D6474-99). GPC data was obtained using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("$M_n$") and 5.0% for the weight average molecular weight ("$M_w$"). The molecular weight distribution (MWD) is the weight average molecular weight divided by the number average molecular weight, $M_w/M_n$. The z-average molecular weight distribution is $M_z/M_n$. Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with Cirrus GPC software. The columns were calibrated with narrow distribution polystyrene standards. The polystyrene molecular weights were converted to polyethylene molecular weights using the Mark-Houwink equation, as described in the ASTM standard test method D6474.

Primary melting peak (° C.), heat of fusion (J/g) and crystallinity (%) was determined using differential scanning calorimetry (DSC) as follows: the instrument was first calibrated with indium; after the calibration, a polymer specimen is equilibrated at 0° C. and then the temperature was increased to 200° C. at a heating rate of 10° C./min; the melt was then kept isothermally at 200° C. for five minutes; the melt was then cooled to 0° C. at a cooling rate of 10° C./min and kept at 0° C. for five minutes; the specimen was then heated to 200° C. at a heating rate of 10° C./min. The DSC Tm, heat of fusion and crystallinity are reported from the 2$^{nd}$ heating cycle.

The short chain branch frequency (SCB per 1000 carbon atoms) of the polyethylene composition was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements. Unsaturations in the polyethylene composition were also determined by Fourier Transform Infrared Spectroscopy (FTIR) as per ASTM D3124-98. Comonomer content can also be measured using $^{13}$C NMR techniques as discussed in Randall, Rev. Macromol. Chem. Phys., C29 (2&3), p 285; U.S. Pat. No. 5,292,845 and WO 2005/121239.

Polyethylene composition density (g/cm$^3$) was measured according to ASTM D792.

Hexane extractables were determined according to ASTM D5227.

Shear viscosity was measured by using a Kayeness WinKARS Capillary Rheometer (model # D5052M-115). For the shear viscosity at lower shear rates, a die having a die diameter of 0.06 inch and L/D ratio of 20 and an entrance angle of 180 degrees was used. For the shear viscosity at higher shear rates, a die having a die diameter of 0.012 inch and L/D ratio of 20 was used.

To determine CDBI(50), a solubility distribution curve is first generated for the polyethylene composition. This is accomplished using data acquired from the TREF technique. This solubility distribution curve is a plot of the weight fraction of the copolymer that is solubilized as a function of temperature. This is converted to a cumulative distribution curve of weight fraction versus comonomer content, from which the CDBI(50) is determined by establishing the weight percentage of a copolymer sample that has a comonomer content within 50% of the median comonomer content on each side of the median (See WO 93/03093 and U.S. Pat. No. 5,376,439). The CDBI(25) is determined by establishing the weight percentage of a copolymer sample that has a comonomer content within 25% of the median comonomer content on each side of the median The temperature rising elution fractionation (TREF) method used herein was as follows. Polymer samples (50 to 150 mg) were introduced into the reactor vessel of a crystallization-TREF unit (Polymer ChAR™). The reactor vessel was filled with 20 to 40 ml 1,2,4-trichlorobenzene (TCB), and heated to the desired dissolution temperature (e.g., 150° C.) for 1 to 3 hours. The solution (0.5 to 1.5 ml) was then loaded into the TREF column filled with stainless steel beads. After equilibration at a given stabilization temperature (e.g., 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer ChAR software, Excel spreadsheet and TREF software developed in-house.

High temperature GPC equipped with an online FTIR detector (GPC-FTIR) was used to measure the comonomer content as the function of molecular weight.

Plaques molded from the polyethylene compositions were tested according to the following ASTM methods: Bent Strip Environmental Stress Crack Resistance (ESCR) at Condition B at 100% IGEPAL at 50° C., ASTM D1693; notched Izod impact properties, ASTM D256; Flexural Properties, ASTM D 790; Tensile properties, ASTM D 638; Vicat softening point, ASTM D 1525; Heat deflection temperature, ASTM D 648.

Dynamic mechanical analyses were carried out with a rheometer, namely Rheometrics Dynamic Spectrometer (RDS-II) or Rheometrics SR5 or ATS Stresstech, on compression molded samples under nitrogen atmosphere at 190° C., using 25 mm diameter cone and plate geometry. The oscillatory shear experiments were done within the linear viscoelastic range of strain (10% strain) at frequencies from 0.05 to 100 rad/s. The values of storage modulus (G'), loss modulus (G"), complex modulus (G*) and complex viscosity (η) were obtained as a function of frequency. The same rheological data can also be obtained by using a 25 mm diameter parallel plate geometry at 190° C. under nitrogen atmosphere.

Examples of the polyethylene compositions were produced in a dual reactor solution polymerization process in which the contents of the first reactor flow into the second reactor. This in-series "dual reactor" process produces an "in-situ" polyethylene blend (i.e., the polyethylene composition). Note, that when an in-series reactor configuration is used, un-reacted ethylene monomer, and un-reacted alpha-olefin comonomer present in the first reactor will flow into the downstream second reactor for further polymerization.

In the present inventive examples, although no co-monomer is feed directly to the downstream second reactor, an ethylene copolymer is nevertheless formed in second reactor due to the significant presence of un-reacted 1-octene flowing from the first reactor to the second reactor where it is copolymerized with ethylene. Each reactor is sufficiently agitated to give conditions in which components are well mixed. The volume of the first reactor was 12 liters and the volume of the second reactor was 22 liters. These are the pilot plant scales. The first reactor was operated at a pressure of 10500 to 35000 kPa and the second reactor was operated at a lower pressure to facilitate continuous flow from the first reactor to the second. The solvent employed was methylpentane. The process operates using continuous feed streams. The catalyst employed in the dual reactor solution process experiments was a phosphinimine catalyst, which was a titanium complex having a phosphinimine ligand (e.g., (tert-butyl)$_3$P=N), a cyclopentadienide ligand (e.g., Cp) and two activatable ligands, such as but not limited to chloride ligands (note: "activatable ligands" are removed, by for example electrophilic abstraction using a co-catalyst or activator to generate an active metal center). A boron based co-catalyst (e.g., Ph$_3$CB(C$_6$F$_5$)$_4$) was used in approximately stoichiometric amounts relative to the titanium complex. Commercially available methylaluminoxane (MAO) was included as a scavenger at an Al:Ti of about 40:1. In addition, 2,6-di-tert-butylhydroxy-4-ethylbenzene was added to scavenge free trimethylaluminum within the MAO in a ratio of Al:OH of about 0.5:1.

The polyethylene compositions of Examples 1-6 which are inventive are made using a single site phosphinimine catalyst in a dual reactor solution process as described above. Each has a melt index I$_2$ of greater than 10 g/10 min, a SCB1/SCB2 ratio of greater than 1.0 and a Mz value of less than 300,000. Examples 1-6 also have an optimized melt flow ratio I$_{21}$/I$_2$ falling within a range of from 24 to 38.

The polyethylene compositions of Example 7, 8 and 9 are comparative and each has a melt index, I$_2$ of greater than 10 g/10 min, a SCB1/SCB2 of greater than 1.0 and a and a Mz value of less than 300,000. However, in contrast to Examples 1-6, Examples 7-9 have a melt flow ratio $I_{21}/I_2$ of greater than 41. The polyethylene compositions of Examples 7-9 are also made using a single site phosphinimine catalyst in a dual reactor solution process as described above.

The polymerization conditions used to make the polyethylene compositions are provided in Table 1.

Table 2 shows polymer composition properties and pressed polymer plaque data.

Calculated properties for the first ethylene copolymer and the second ethylene copolymer for the polyethylene compositions are provided in Table 3 (see "Copolymerization Reactor Modeling" below for methods).

Copolymerization Reactor Modeling

For multicomponent (or bimodal resins) polyethylene polymers with very low comonomer content, it can be difficult to reliably estimate the short chain branching (and subsequently polyethylene resin density by combining other information) of each polymer component by mathematical deconvolution of GPC-FTIR data, as was done in, for example, U.S. Pat. No. 8,022,143. Instead, the $M_w$, $M_n$, $M_z$, $M_w/M_n$ and the short chain branching per thousand carbons (SCB/1000C) of the first and second copolymers were calculated herein, by using a reactor model simulation using the input conditions which were employed for actual pilot scale run conditions (for references on relevant reactor modeling methods, see "Copolymerization" by A. Hamielec, J. MacGregor, and A. Penlidis in *Comprehensive Polymer Science and Supplements*, volume 3, Chapter 2, page 17, Elsevier, 1996 and "Copolymerization of Olefins in a Series of Continuous Stirred-Tank Slurry-Reactors using Heterogeneous Ziegler-Natta and Metallocene Catalysts. I. General Dynamic Mathemacial Model" by J. B. P Soares and A. E Hamielec in *Polymer Reaction Engineering*, 4(2&3), p 153, 1996.) This type of model is considered reliable for the estimate of comonomer (e.g., 1-octene) content even at low comonomer incorporation levels, since the ethylene conversion, ethylene input flow and comonomer input flow can be obtained directly from the experimental conditions and because the reactive ratio (see below) can be reliably estimated for the catalyst system used in the present disclosure. For clarity, the "monomer" or "monomer 1" represent ethylene, while the terms "comonomer" or "monomer 2", represent 1-octene.

The model takes for input the flow of several reactive species (e.g. catalyst, monomer such as ethylene, comonomer such as 1-octene, hydrogen, and solvent) going to each reactor, the temperature (in each reactor), and the conversion of monomer (in each reactor), and calculates the polymer properties (of the polymer made in each reactor, i.e., the first and second ethylene copolymers) using a terminal kinetic model for continuously stirred tank reactors (CSTRs) connected in series. The "terminal kinetic model" assumes that the kinetics depend upon the monomer unit within the polymer chain on which the active catalyst site is located (see "Copolymerization" by A. Hamielec, J. MacGregor, and A. Penlidis in *Comprehensive Polymer Science and Supplements*, Volume 3, Chapter 2, page 17, Elsevier, 1996). In the model, the copolymer chains are assumed to be of reasonably large molecular weight to ensure that the statistics of monomer/comonomer unit insertion at the active catalyst center is valid and that monomers/comonomers consumed in routes other than propagation are negligible. This is known as the "long chain" approximation.

The terminal kinetic model for polymerization includes reaction rate equations for activation, initiation, propagation, chain transfer, and deactivation pathways. This model solves the steady-state conservation equations (e.g., the total mass balance and heat balance) for the reactive fluid which comprises the reactive species identified above.

The total mass balance for a generic CSTR with a given number of inlets and outlets is given by:

$$0 = \Sigma_i \dot{m}_i \quad (1)$$

where $\dot{M}_1$ represents the mass flow rate of individual streams with index i indicating the inlet and outlet streams.

Equation (1) can be further expanded to show the individual species and reactions:

$$0 = \frac{\Sigma_i \frac{m \dot{x}_{ij}}{M_i}}{\rho_{mix} V} + \frac{R_j}{\rho_{mix}} \quad (2)$$

where $M_i$ is the average molar weight of the fluid inlet or outlet (O), $x_{ij}$ is the mass fraction of species j in stream i, $\rho_{mix}$ is the molar density of the reactor mixture, V is the reactor volume, $R_j$ is the reaction rate for species j, which has units of kmol/m$^3$ s. The total heat balance is solved for an adiabatic reactor and is given by:

$$0 = (\Sigma \dot{m}_i \Delta H_i + q_{Rx} V + \dot{W} - \dot{Q}) \quad (3)$$

where, $\dot{m}_i$ is the mass flow rate of stream i (inlet or outlet), $\Delta H_i$ is the difference in enthalpy of stream i versus a reference state, $q_{Rx}$ is the heat released by reaction(s), V is the reactor volume, $\dot{W}$ is the work input (i.e., agitator), $\dot{Q}$ is the heat input/loss.

The catalyst concentration input to each reactor is adjusted to match the experimentally determined ethylene conversion and reactor temperature values in order solve the equations of the kinetic model (e.g., propagation rates, heat balance and mass balance).

The H$_2$ concentration input to each reactor may be likewise adjusted so that the calculated molecular weight distribution of a polymer made over both reactors (and, hence, the molecular weight of polymer made in each reactor) matches that which is observed experimentally.

The degree of polymerization (DPN) for a polymerization reaction is given by the ratio of the rate of chain propagation reactions over the rate of chain transfer/termination reactions:

$$DPN = \frac{k_{p11}\phi_1[m_1] + k_{p12}\phi_1[m_2] + k_{p21}\phi_2[m_2]}{k_{tm11}[m_1]\phi_1 + k_{tm12}[m_2]\phi_1 + k_{tm21}[m_2]\phi_2 + k_{ts1}\phi_1 + k_{ts2}\phi_2 + k_{tH1}[H] + k_{tH2}[H]} \quad (4)$$

where $k_{p12}$ is the propagation rate constant for adding monomer 2 to a growing polymer chain ending with monomer 1, [m$_1$] is the molar concentration of monomer 1 (ethylene) in the reactor, [m$_2$] is the molar concentration of monomer 2 (1-octene) in the reactor, $k_{m12}$ the termination rate constant for chain transfer to monomer 2 for a growing chain ending with monomer 1, $k_{ts1}$ is rate constant for the spontaneous chain termination for a chain ending with monomer 1, $k_{tH1}$ is the rate constant for the chain termination by hydrogen for a chain ending with monomer 1. $\phi_1$ and $\phi_2$ and the fraction of catalyst sites occupied by a chain ending with monomer 1 or monomer 2 respectively.

The number average molecular weight (Mn) for a polymer follows from the degree of polymerization and the molecular weight of a monomer unit. From the number average molecular weight of polymer in each reactor, and assuming a Flory distribution for a single site catalyst, the molecular weight distribution is determined for the polymer formed in each reactor:

$$w(n) = \tau^2 n e^{-\tau n} \quad (5)$$

where $\tau=1/DPN$, and $w(n)$ is the weight fraction of polymer having a chain length n. The Flory distribution can be transformed into the common log scaled GPC trace by applying:

$$\frac{dW}{d\log(M)} = \ln(10)\frac{n^2}{DPN^2}e^{\left(-\frac{n}{DPN}\right)} \quad (6)$$

where $dW/d\log(MW)$ is the differential weight fraction of polymer with a chain length n (n=MW/28 where 28 is the molecular weight of the polymer segment corresponding to a $C_2H_4$ unit) and DPN is the degree of polymerization as calculated by Equation (4). From the Flory model, the $M_w$ and the $M_z$ of the polymer made in each reactor are: $M_w=2\times M_n$ and $M_z=1.5\times M_w$.

The overall molecular weight distribution over both reactors is simply the sum of the molecular weight distribution of polymer made in each reactor, and where each Flory distribution is multiplied by the weight fraction of polymer made in each reactor:

$$\frac{d\overline{W}}{d\log(MW)} = W_{R1}\left(\ln(10)\frac{n^2}{DPN_{R1}^2}e^{\left(-\frac{n}{DPN_{R1}}\right)}\right) + W_{R2}\left(\ln(10)\frac{n^2}{DPN_{R2}^2}e^{\left(-\frac{n}{DPN_{R2}}\right)}\right) \quad (7)$$

where $d\overline{W}/d\log(MW)$ is the overall molecular weight distribution function, $w_{R1}$ and $w_{R2}$ are the weight fraction of polymer made in each reactor, $DPN_1$ and $DPN_2$ is the average chain length of the polymer made in each reactor (i.e. $DPN_1=M_{nR1}/28$). The weight fraction of material made in each reactor is determined from knowing the mass flow of monomer and comonomer into each reactor along with knowing the conversions for monomer and comonomer in each reactor.

The moments of the overall molecular weight distribution (or the molecular weight distribution of polymer made in each reactor) can be calculated using equations 8a, 8b and 8c (a Flory Model is assumed above, but the below generic formula apply to other model distributions as well):

$$\overline{M_n} = \frac{\Sigma_i w_i}{\Sigma_i \frac{w_i}{M_i}} \quad (8a)$$

$$\overline{M_w} = \frac{\Sigma_i w_i M_i}{\Sigma_i w_i} \quad (8b)$$

$$\overline{M_z} = \frac{\Sigma_i w_i M_i^2}{\Sigma_i w_i M_i} \quad (8c)$$

The comonomer content in the polymer product (in each reactor) may also be calculated using the terminal kinetic model and long chain approximations discussed above (see A. Hamielec, J. MacGregor, and A. Penlidis. Comprehensive Polymer Science and Supplements, volume 3, chapter Copolymerization, page 17, Elsevier, 1996).

For a given catalyst system, the comonomer (e.g., 1-octene) incorporation is a function of the monomer (e.g., ethylene) conversion, the comonomer to monomer ratio in the reactor ($\gamma$) and the reactivity ratio of monomer 1 (e.g., ethylene) over monomer 2 (e.g., 1-octene):

$$r_1 = k_{p11}/k_{p12}.$$

For a CSTR, the molar ratio of ethylene to comonomer in the polymer (Y) can be estimated knowing the reactivity ratio $r_1$ of the catalyst system and knowing the ethylene conversion in the reactor ($Q_{m1}$). A quadratic equation can be derived using the May and Lewis equation for instantaneous comonomer incorporation (see "Copolymerization" by A. Hamielec, J. MacGregor, and A. Penlidis in *Comprehensive Polymer Science and Supplements*, Volume 3, Chapter 2, page 17, Elsevier, 1996) and solving the mass balance around the reaction. The molar ratio of ethylene to 1-octene in the polymer is the negative root of the following quadratic equation:

$$-Y^2\frac{\gamma}{4} + \left[r_1 + Q_{m1}(1-r_1) + \frac{\gamma}{4}\right]Y - Q_{m1} = 0 \quad (9)$$

where Y is the molar ratio of ethylene to 1-octene in the polymer, $\gamma$ is the mass flow ratio of 1-octene to ethylene going the reactor, $r_1$ is the reactivity ratio of monomer 1 to monomer 2 for the catalyst system ($r_1=k_{p11}/k_{p12}$) and $Q_{m1}$ is the ethylene monomer fractional conversion.

The branching frequency can then be calculated knowing the molar ratio of monomer 1 to monomer 2 in the polymer:

$$BF = \frac{500}{Y+1} \quad (10)$$

where Y, is the molar ratio of monomer 1 (ethylene) over monomer 2 (1-octene) in the polymer, and BF is the branching frequency (branches per 1000 carbon atoms).

The overall branching frequency distribution (BFD) of the ethylene composition can be calculated by knowing the molecular weight distribution and weight fraction of polymer made in each reactor, and the average branching frequency (BF) of the ethylene copolymer made in each reactor. The fraction of polymer made in each reactor can be calculated from the experimental mass flows and conversion of monomer and comonomer in each reactor. The branching frequency distribution function is obtained by calculating the average branch content for each molecular weight value of the overall molecular weight distribution function made from the two Flory distributions:

$$BF_{MW} = \frac{w_{R1}BF_{R1}F_1(MW_{R1}) + w_{R2}BF_{R2}F_2(MW_{R2})}{w_{R1}F_1(MW_{R1}) + w_{R2}F_2(MW_{R2})} \quad (11)$$

where $BF_{MW}$ is the branching at molecular weight (MW), $w_{R1}$ and $w_{R2}$ are the weight fraction of polymer made in Reactor 1 and Reactor 2, $BF_{R1}$ and $BF_{R2}$ are the average branching frequency of polymer made in R1 and R2 (from Equations 9 and 10), $F_1(MW_{R1})$ and $F_2(MW_{R2})$ are Flory distribution function from Reactor 1 and Reactor 2.

The overall branching frequency of the polyethylene composition is given by the weighted average of the branching frequency of the polymer made in each reactor:

$$BF_{avg} = w_1 BF_1 + w_2 BF_2 \quad (12)$$

where, $BF_{avg}$ is the average branching frequency for the total polymer (e.g. the polyethylene composition), $w_1$ and $w_2$ are the weight fraction of material made in each reactor, $BF_1$ and $BF_2$ are the branching frequency of material made in each reactor (e.g., the branching frequency of the first and second ethylene copolymers).

For the polymer obtained in each reactor, the key resin parameters which are obtained from the above described kinetic model are the molecular weights Mn, Mw and Mz, the molecular weight distributions $M_w/M_n$ and Mz/Mw and the branching frequency (SCB/1000 Cs). With this information in hand, a component (or composition) density model and a component (or composition) melt index, $I_2$, model was used according to the following equations, which were empirically determined, to calculate the density and melt index $I_2$ of each of the first and second ethylene copolymers:

Density:

$$\frac{1}{\rho} = 1.0142 + 0.0033(1.22 \cdot BF)^{0.8346} + \frac{0.0303 k^{0.9804}}{1 + \frac{0.3712}{e^{1.22BF}}}$$

where, BF is the branching frequency, $k = \log_{10}(M_n/1000)$

Melt Index, $I_2$ (MI):

$$\log_{10}(MI) = 7.8998 - 3.9089 \log_{10}\left(\frac{M_w}{1000}\right) - 0.2799 \frac{M_n}{M_w}$$

Hence, the above models were used to estimate the branch frequency, weight fraction (or weight percent), melt index $I_2$ and the density of the polyethylene composition components, which were formed in each of reactor 1 and 2 (i.e. the first and second ethylene copolymers).

TABLE 1

Reactor Conditions

| Example No. | Inventive Example 1 | Inventive Example 2 | Inventive Example 3 | Inventive Example 4 | Inventive Example 5 | Inventive Example 6 | Comp. Example 7 | Comp. Example 8 | Comp. Example 9 |
|---|---|---|---|---|---|---|---|---|---|
| Reactor 1 | | | | | | | | | |
| Ethylene (kg/h) | 39.46 | 38.34 | 35.35 | 35.35 | 35.32 | 35.32 | 35.33 | 38.34 | 35.31 |
| Octene (kg/h) | 3.68 | 3.36 | 2.50 | 0.74 | 0.85 | 0.85 | 4.94 | 6.01 | 2.07 |
| Hydrogen (g/h) | 0.95 | 0.92 | 0.87 | 0.92 | 1.14 | 1.09 | 0.64 | 0.74 | 0.75 |
| Solvent (kg/h) | 336.24 | 313.29 | 289.90 | 294.09 | 289.42 | 293.32 | 289.74 | 324.27 | 292.74 |
| Reactor feed inlet temperature (° C.) | 34.94 | 30.07 | 30.00 | 30.06 | 30.00 | 30.08 | 29.99 | 29.99 | 30.02 |
| Reactor Temperature (° C.) | 162.06 | 162.71 | 162.05 | 161.97 | 162.02 | 161.72 | 161.01 | 157.19 | 163.33 |
| Catalyst- Fresh Ti Feed to R1 (ppm) | 0.02 | 0.03 | 0.02 | 0.01 | 0.01 | 0.02 | 0.02 | 0.03 | 0.02 |
| Reactor 2 | | | | | | | | | |
| Ethylene (kg/h) | 48.23 | 46.85 | 43.18 | 43.18 | 43.17 | 43.17 | 43.18 | 46.86 | 43.18 |
| Octene (kg/h) | 0.00 | 0.00 | 0.00 | 0.00 | 0.00 | 0.00 | 0.00 | 0.00 | 0.00 |
| Hydrogen (g/h) | 10.11 | 9.59 | 7.94 | 9.97 | 8.41 | 10.94 | 17.46 | 19.45 | 17.47 |
| Solvent (kg/h) | 169.99 | 198.07 | 126.66 | 126.66 | 126.70 | 126.71 | 126.67 | 184.44 | 126.69 |
| Reactor feed inlet temperature (° C.) | 34.92 | 30.09 | 31.10 | 33.08 | 30.70 | 31.65 | 32.80 | 29.95 | 32.69 |
| Reactor Temperature (° C.) | 207.98 | 201.77 | 215.72 | 216.00 | 215.98 | 215.82 | 215.82 | 200.08 | 216.34 |
| Catalyst- Fresh Ti Feed to R1 (ppm) | 0.05 | 0.07 | 0.10 | 0.10 | 0.10 | 0.11 | 0.15 | 0.07 | 0.15 |

TABLE 2

Resin Properties

| Example No. | Inv. Ex. 1 | Inv. Ex. 2 | Inv. Ex. 3 | Inv. Ex. 4 | Inv. Ex. 5 | Inv. Ex. 6 | Comp. Ex. 7 | Comp. Ex. 8 | Comp. Ex. 9 |
|---|---|---|---|---|---|---|---|---|---|
| Density (g/cm³) | 0.9515 | 0.9516 | 0.9522 | 0.9585 | 0.9573 | 0.9589 | 0.9516 | 0.951 | 0.958 |
| Rheology/Flow Properties | | | | | | | | | |
| Melt Index $I_2$ (g/10 min) | 11 | 12.2 | 12.2 | 11.2 | 17.6 | 16.2 | 12.2 | 10.5 | 12.2 |
| Melt Flow Ratio ($I_{21}/I_2$) | 28.5 | 28.8 | 30.2 | 31.4 | 28.2 | 33 | 41.4 | 42.3 | 42.2 |
| Stress Exponent | 1.27 | 1.29 | 1.28 | 1.31 | 1.27 | 1.3 | 1.35 | 1.33 | 1.34 |
| Shear Viscosity ($\eta$) at $10^5$ s$^{-1}$ (240° C., Pa-s) | 6.9 | 5.9 | 6.4 | 6 | 5.8 | 5.6 | 4.5 | 4.55 | 4.6 |

TABLE 2-continued

Resin Properties

| Example No. | Inv. Ex. 1 | Inv. Ex. 2 | Inv. Ex. 3 | Inv. Ex. 4 | Inv. Ex. 5 | Inv. Ex. 6 | Comp. Ex. 7 | Comp. Ex. 8 | Comp. Ex. 9 |
|---|---|---|---|---|---|---|---|---|---|
| Shear viscosity Ratio ($\eta_{100}/\eta_{100000}$, 240° C.) | 43.41 | 42.53 | 42.69 | 47.58 | 35.33 | 38.16 | 56.42 | 60.06 | 57.87 |
| GPC | | | | | | | | | |
| $M_n$ | 18082 | 16526 | 16163 | 17467 | 15998 | 14184 | 10525 | 11330 | 10843 |
| $M_w$ | 60498 | 53795 | 55025 | 57760 | 51350 | 51344 | 53250 | 56878 | 53731 |
| $M_z$ | 149312 | 124893 | 129801 | 132308 | 112419 | 125438 | 142692 | 152748 | 140335 |
| Polydispersity Index ($M_w/M_n$) | 3.35 | 3.26 | 3.40 | 3.31 | 3.21 | 3.62 | 5.06 | 5.02 | 4.96 |
| $M_z/M_w$ | 2.47 | 2.32 | 2.36 | 2.29 | 2.19 | 2.44 | 2.68 | 2.69 | 2.61 |
| TREF | | | | | | | | | |
| CDBI(50) | 79.7 | 78.9 | 76.4 | 65.8 | 70.6 | 68.1 | 71.9 | 76.5 | 65 |
| CDBI(25) | 71.1 | 70.5 | 66.1 | 50.1 | 55.4 | 52.1 | 62.2 | 66.9 | 51.2 |
| Branch Frequency-FTIR (uncorrected for chain end —$CH_3$) | | | | | | | | | |
| Uncorrected SCB/1000C | 2.4 | 2.5 | 2.4 | 1.8 | 1.7 | 1.6 | 4.3 | 3.9 | 2.9 |
| Uncorrected comonomer content (mol %) | 0.48 | 0.50 | 0.48 | 0.36 | 0.34 | 0.32 | 0.86 | 0.78 | 0.58 |
| Internal unsaturation/1000 C | 0.11 | 0.11 | 0.16 | 0.13 | 0.15 | 0.12 | 0.13 | 0.08 | 0.12 |
| Side Chain unsaturation/1000 C | 0 | 0 | 0 | 0 | 0 | 0 | 0 | 0.01 | 0 |
| Terminal unsaturation/1000 C | 0.14 | 0.18 | 0.18 | 0.14 | 0.2 | 0.18 | 0.2 | 0.16 | 0.18 |
| Comonomer | 1-octene | 1-octene | 1-octene | 1-octene | 1-octene | 1-octene | 1-octene | 1-octene | 1-octene |
| DSC | | | | | | | | | |
| Primary Melting Peak (° C.) | 128.44 | 128.12 | 128.27 | 130.12 | 129.99 | 130.45 | 126.54 | 126.37 | 128.68 |
| Heat of Fusion (J/g) | 204.4 | 209.5 | 205.2 | 222.2 | 222.2 | 223.1 | 206.5 | 211.1 | 221.4 |
| Crystallinity (%) | 70.50 | 72.24 | 70.74 | 76.63 | 76.63 | 76.92 | 71.2 | 72.78 | 76.34 |
| Other Properties | | | | | | | | | |
| Hexane Extractables (%) | 0.11 | 0.27 | 0.4 | 0.31 | 0.35 | 0.38 | 0.74 | 0.6 | 0.64 |
| VICAT Soft. Pt. (° C.)-Plaque | 125.5 | 125.3 | 125 | 126 | 126 | 126 | 122 | 123.1 | 124 |
| Heat Deflection Temp. (° C.) @ 66 PSI | 67.2 | 71.8 | 73 | 77 | 78 | 81 | 66 | 68.8 | 76 |
| ESCR Cond. B at 100% (hrs)-Plaque | 7.5 | 3 | 2.5 | 2 | 0 | 0 | 1 | 6 | 0 |
| Flex Secant Mod. 2% (MPa)-Plaque | 1072 | 964 | 1037 | 1166 | 1174 | 1229 | 1005 | 953 | 1192 |
| Notched Izod Impact (ft-lb/in)-Plaque | 0.9 | 0.9 | 0.9 | 0.8 | 0.7 | 0.7 | 0.7 | 0.8 | 0.7 |

TABLE 3

Polyethylene Component Properties

| Example No. | Inv. Ex. 1 | Inv. Ex. 2 | Inv. Ex. 3 | Inv. Ex. 4 | Inv. Ex. 5 | Inv. Ex. 6 | Comp. Ex. 7 | Comp. Ex. 8 | Comp. Ex. 9 |
|---|---|---|---|---|---|---|---|---|---|
| Polyethylene Composition | | | | | | | | | |
| Density (g/cm$^3$) | 0.9515 | 0.9516 | 0.9522 | 0.9585 | 0.9573 | 0.9589 | 0.9516 | 0.951 | 0.958 |
| $I_2$ (g/10 min) | 11 | 12.2 | 12.2 | 11.2 | 17.6 | 16.2 | 12.2 | 10.5 | 12.2 |
| Stress Exponent | 1.27 | 1.29 | 1.28 | 1.31 | 1.27 | 1.3 | 1.35 | 1.33 | 1.34 |
| MFR ($I_{21}/I_2$) | 28.5 | 28.8 | 30.2 | 31.4 | 28.2 | 33 | 41.4 | 42.3 | 42.2 |
| Mw/Mn | 3.35 | 3.26 | 3.40 | 3.31 | 3.21 | 3.62 | 5.06 | 5.02 | 4.96 |
| First Ethylene | | | | | | | | | |

TABLE 3-continued

| | Polyethylene Component Properties | | | | | | | | |
|---|---|---|---|---|---|---|---|---|---|
| Example No. | Inv. Ex. 1 | Inv. Ex. 2 | Inv. Ex. 3 | Inv. Ex. 4 | Inv. Ex. 5 | Inv. Ex. 6 | Comp. Ex. 7 | Comp. Ex. 8 | Comp. Ex. 9 |
| Polymer | | | | | | | | | |
| Weight fraction | 0.426 | 0.435 | 0.436 | 0.434 | 0.433 | 0.432 | 0.439 | 0.434 | 0.438 |
| Mw | 116751 | 101653 | 98055 | 100313 | 86464 | 86314 | 102312 | 106003 | 106445 |
| $I_2$ (g/10 min.) | 0.48 | 0.82 | 0.95 | 0.86 | 1.55 | 1.56 | 0.8 | 0.7 | 0.68 |
| Density, d1 (g/cm$^3$) | 0.9340 | 0.9365 | 0.9389 | 0.9462 | 0.9472 | 0.9472 | 0.9327 | 0.9320 | 0.9396 |
| SCB1/1000 C | 1.68 | 1.48 | 1.16 | 0.35 | 0.38 | 0.39 | 2.31 | 2.4 | 0.96 |
| Second Ethylene Polymer | | | | | | | | | |
| Weight fraction | 0.574 | 0.565 | 0.564 | 0.566 | 0.567 | 0.568 | 0.561 | 0.566 | 0.562 |
| Mw | 17808 | 21717 | 20946 | 18887 | 20705 | 17380 | 11791 | 12924 | 12556 |
| $I_2$ (g/10 min) | 743 | 342 | 394 | 590.6 | 412 | 818 | 3724 | 2603 | 2914 |
| Density d2 (g/cm$^3$) | 0.9578 | 0.9576 | 0.959 | 0.9635 | 0.9625 | 0.964 | 0.9616 | 0.9602 | 0.965 |
| SCB2/1000 C | 1 | 0.72 | 0.58 | 0.18 | 0.2 | 0.2 | 1.13 | 1.21 | 0.47 |
| Estimated (d2 − d1) g/cm$^3$ | 0.0238 | 0.0211 | 0.0201 | 0.0173 | 0.0153 | 0.0168 | 0.0289 | 0.0282 | 0.0254 |
| Estimated SCB1/SCB2 | 1.68 | 2.06 | 2.00 | 1.94 | 1.90 | 1.95 | 2.04 | 1.98 | 2.04 |

The polymer compositions of Examples 1-9 were injection molded into hinge components as further described below.

Hinge Component

A four-cavity hinged component mold was used which can produce four types of hinged component. These four hinged components may have different geometries and dimensions which are designed to simulate the hinge sections of typical hinged caps and closures. Among the four types of hinged components, hinge component, "hinge number 4" was used in the present analysis. The design and dimensions of hinge No. 4 are provided in FIGS. 1-3.

Injection Molding Conditions

The four-cavity hinge component mold described above is used in a Sumitomo injection molding machine (model SE75EV C250M, 28 mm screw diameter). The injection molding processing conditions are given in Table 4.

TABLE 4

| | Injection Molding Parameters | | | | | | | | |
|---|---|---|---|---|---|---|---|---|---|
| Example No. | Inv. 1 | Inv. 2 | Inv. 3 | Inv. 4 | Inv. 5 | Inv. 6 | Comp. 7 | Comp. 8 | Comp. 9 |
| Part Weight (g) | 10.1 | 10.0 | 10.1 | 10.1 | 10.1 | 10.0 | 10.0 | 10.1 | 10.0 |
| Injection Speed (mm/s) | 135 | 135 | 135 | 135 | 135 | 135 | 135 | 135 | 135 |
| Cycle time (s) | 19.569 | 19.619 | 19.568 | 19.569 | 19.569 | 19.569 | 19.568 | 19.569 | 19.568 |
| Filling time (s) | 0.2212 | 0.2212 | 0.2212 | 0.2211 | 0.2211 | 0.2210 | 0.2210 | 0.2210 | 0.2210 |
| Dosing time (s) | 4.083 | 4.095 | 4.149 | 4.241 | 4.200 | 4.199 | 4.163 | 4.206 | 4.190 |
| Minimum Cushion (mm) | 5.699 | 5.653 | 5.479 | 4.931 | 5.700 | 5.713 | 5.729 | 5.261 | 5.586 |
| Filling peak pressure (psi) | 16806.2 | 16480.2 | 16039.6 | 15572 | 15287.7 | 14527.8 | 13310.9 | 13738.3 | 13362.8 |
| Full peak pressure (psi) | 16806.3 | 16480.2 | 16039.6 | 15572 | 15287.7 | 14527.8 | 13310.9 | 13738.3 | 13362.8 |
| Hold end position (mm) | 5.699 | 5.653 | 5.479 | 4.931 | 5.700 | 5.713 | 5.729 | 5.261 | 5.586 |
| Hold pressure set (psi) | 14000 | 14000 | 14000 | 14500 | 13000 | 13000 | 12500 | 13500 | 13500 |
| Clamp force (ton) | 50.51 | 50.14 | 49.91 | 50.71 | 50.01 | 50.47 | 50.06 | 50.12 | 50.46 |
| Fill start position (mm) | 38.506 | 38.506 | 38.506 | 38.506 | 38.506 | 38.506 | 38.506 | 38.506 | 38.506 |
| Dosing back pressure (psi) | 1797 | 1740.2 | 1774.2 | 1802.5 | 1632.2 | 1630.7 | 1576.7 | 1684 | 1629.1 |
| Pack pressure (psi) | 12021.8 | 11641.7 | 11291.11 | 10854.5 | 10551.4 | 10043.9 | 9312.3 | 9582 | 9380.8 |
| Filling time 1 (s) | 0.224 | 0.224 | 0.224 | 0.224 | 0.224 | 0.224 | 0.224 | 0.224 | 0.224 |
| Temperature zone 1 (° C.) | 230 | 230 | 230 | 230 | 230 | 230 | 230 | 230 | 230 |
| Temperature zone 2 (° C.) | 235 | 235 | 235 | 235 | 235 | 235 | 235 | 235 | 235 |
| Temperature zone 3 (° C.) | 240 | 240 | 240 | 240 | 240 | 240 | 240 | 240 | 240 |
| Temperature zone 4 (° C.) | 240 | 250 | 250 | 250 | 250 | 250 | 250 | 250 | 250 |
| Temperature zone 5 (° C.) | 250 | 250 | 250 | 250 | 250 | 250 | 250 | 250 | 250 |
| Mold temperature stationary (° C.) | 10 | 10 | 10 | 10 | 10 | 10 | 10 | 10 | 10 |
| Mold temperature moving (° C.) | 10 | 10 | 10 | 10 | 10 | 10 | 10 | 10 | 10 |

The Hinge Life Test

Figure 2:
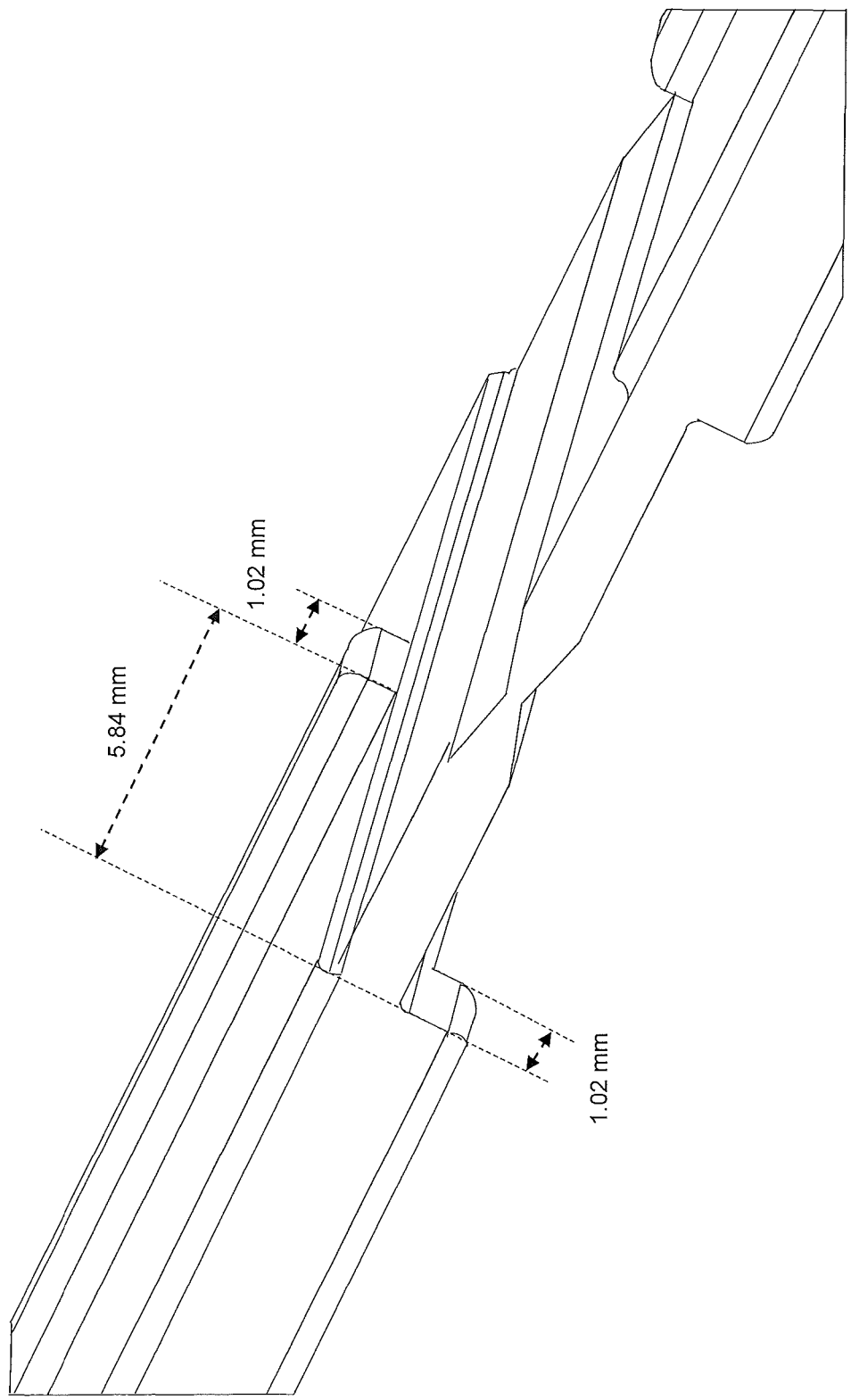
FIG. 2 shows an expanded perspective view of the hinge area of the hinge component, "hinge no. 4" along with some of its dimensions.
Figure 3:
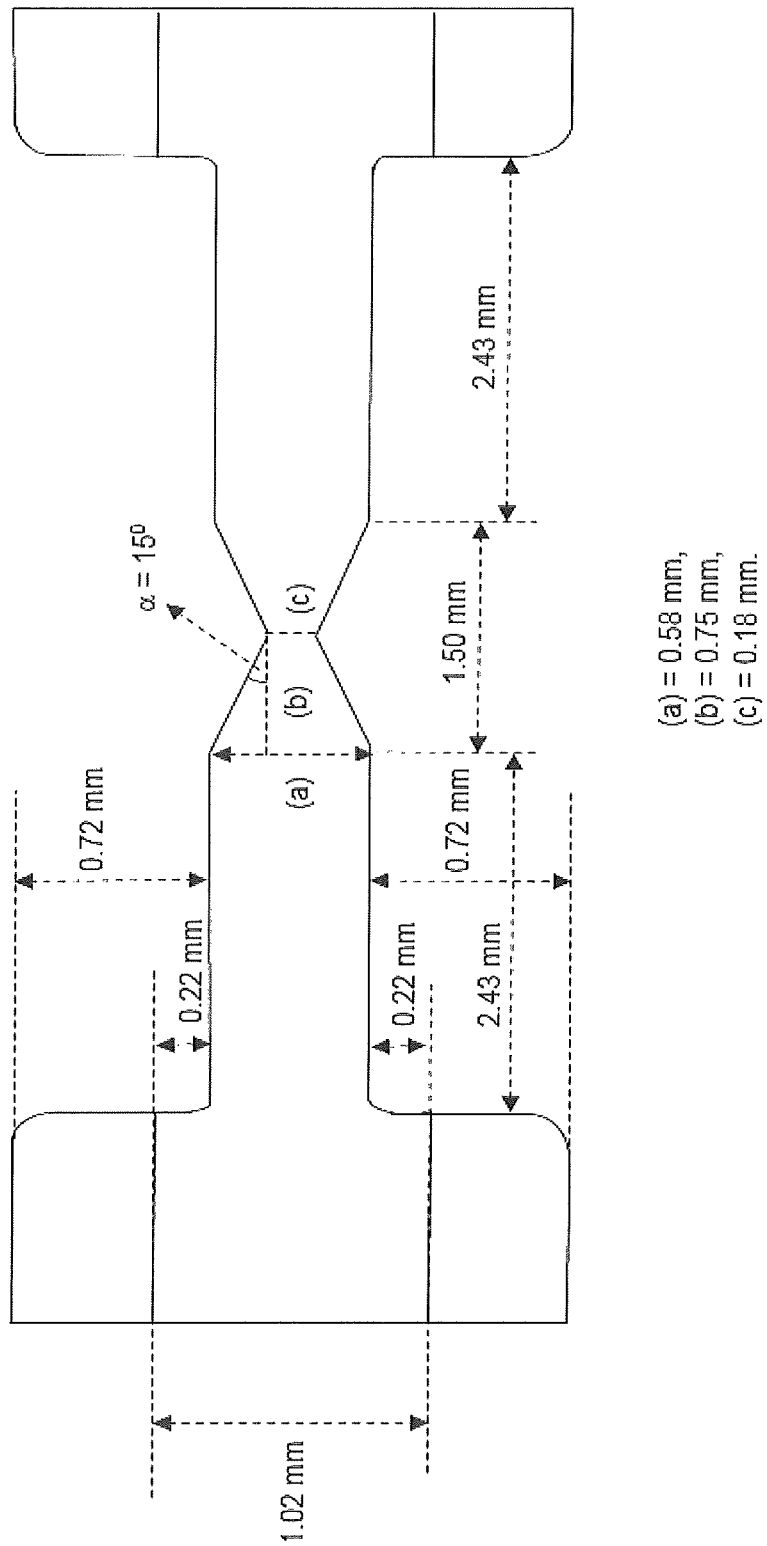
FIG. 3 shows an expanded side view illustration of the hinge component, "hinge no. 4" along with some dimensions and the angle, a which is equal to 15° C.

After injection molding and conditioning at room temperature for at least 72 hours, the hinge number 4 was isolated from the mold and used directly in a so called "hinge component life test". The hinge dimensions were as shown in FIGS. 1-3. Generally, the test involves bending the hinged component from an unstressed, unbent position about its hinge axis and through an angle of about 130° and then allowing the hinged component to return to an unstressed position. The device used to carry out the testing in shown in FIGS. 4 and 5.

Figure 4:
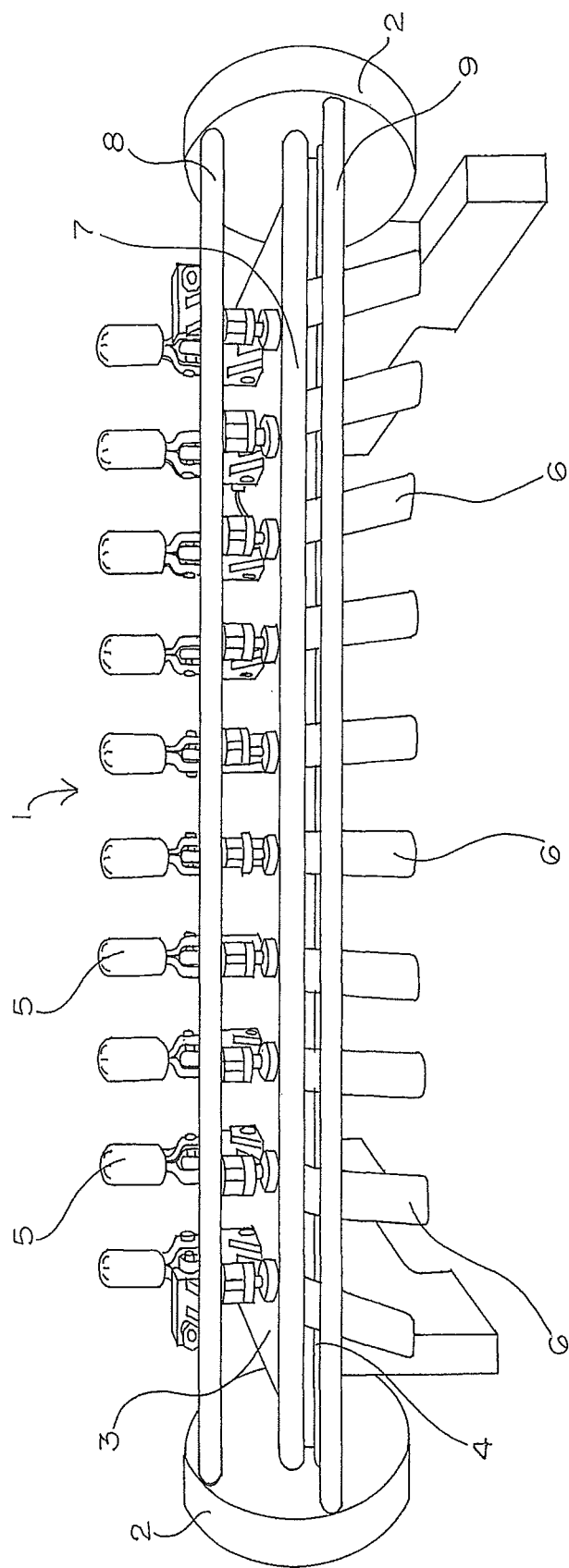
FIG. 4 shows a front perspective view of the device 1, used to measure the average hinge life values of a hinged component.
Figure 5:
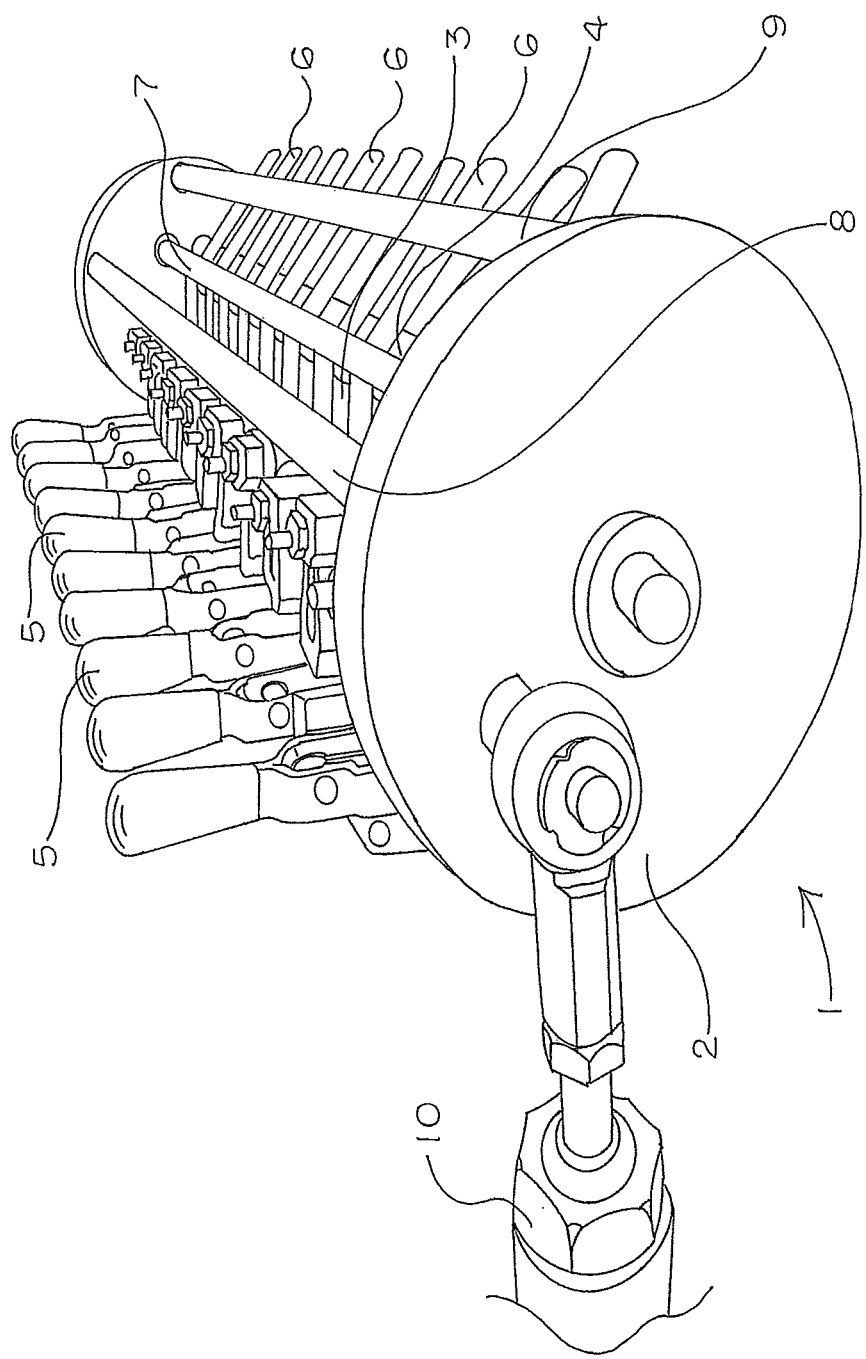
FIG. 5 shows a side perspective view of the device 1, used to measure the average hinge life values of a hinged component.

The device 1 comprises a pair of rotating end disks 2 which encompass a flat plate area 3 between them. The plate has a rounded edge or lip. On the top of the plate area are fixed a series of clamps 5 positioned adjacent to the plate edge. The clamps secure one end of the hinged component on to the plate surface, with the component's hinge axis (or desired location of bending) aligned with the plate edge (note: with reference to FIGS. 1 and 5, the clamp is placed at the longitudinal mid-point of the short side of the hinge component, hinge number 4, shown as element 6 in FIGS. 4 and 5). Hence, the hinged component is clamped on one side of the device as shown in FIGS. 4 and 5 with the hinge axis aligned with the plate edge over which it is to be bent. The other end of the hinged component extends between two lateral bars 4 and 7 which are positioned beyond the hinge axis and which ride over (bar 7) and under (bar 4) the unclamped end of the hinged component. A second set of bars 8 and 9 help to provide structural rigidity to the device. The bars are attached to the rotating end disks, which when rotated, force the upper bar 7 down on the unclamped end of the hinged component bending the hinged component about its hinge axis through an angle of about 130°. This downward bending motion followed by removal of bending stress is considered one cycle (note: after the first bend, the hinge component does not fully return to its original un-bent position). The hinged component is subject to repeated cycles of being bent then allowed to relax. The hinge component testing device was operated at a bending frequency of 45 cycles per minute. The cycles were repeated until the hinged component failed. An electronic counter, for example one which has an actuator that comes in contact with a protuberance on the outside surface of an end disk, may be used in conjunction with the device. A video camera may also be mounted near the device to record the exact cycle count at which a hinge component break occurs. As the device has several areas to clamp a hinged component for side by side testing, ten hinged components being made of the same polymer composition were tested at the same time (see FIGS. 4 and 5). Generally, a total of 20 to 30 hinge component specimens were tested for a given polymer composition. The average number of cycles before the hinge failed and the standard deviations of the hinge life were then calculated and reported for a given polymer composition. The hinge component life test then reports the average numbers of cycles endured by a hinged component made from a given polymer composition before failure. The rotating end disks may be rotated manually or as show in FIG. 5 they may be driven by a hydraulic piston, 10. The results of such testing is provided in Table 6. The hinge life cycle data for hinged components made from the polyethylene compositions of Examples 1-9 are given in Table 5.

TABLE 5

| Example No. | Hinge Life in No. of Cycles | | | | | | | | |
|---|---|---|---|---|---|---|---|---|---|
| | Inv. 1 | Inv. 2 | Inv. 3 | Inv. 4 | Inv. 5 | Inv. 6 | Comp. 7 | Comp. 8 | Comp. 9 |
| Average | 8197 | 8148 | 6669 | 5368 | 4880 | 6193 | 2304 | 3628 | 4015 |
| Standard Deviation | 1049 | 1495 | 663 | 591 | 430 | 664 | 212 | 405 | 614 |
| Sample Size, n | 20 | 20 | 20 | 20 | 20 | 20 | 20 | 20 | 20 |

A comparison between the hinged components made from the polyethylene compositions of Examples 1-6, each of which have a melt flow ratio $I_{21}/I_2$ of below 41, shows that they have much better hinge life cycle values than that observed for a hinged component made with the polyethylene composition of Examples 7-9 which have a melt flow ratio $I_{21}/I_2$ of above 41. The fact that the hinge life cycle performance drops off when the polymer used has a higher melt flow ratio is surprising. Hence, in order to obtain maximum hinge life performance with the polyethylene compositions described herein which have a melt index ($I_2$) of greater than 10 but less than 20 g/10 min, a melt flow ratio ($I_{21}/I_2$) in the range of from about 24 to about 38 would appear to be ideal.

Non-limiting embodiments of the present disclosure include the following:

Embodiment A

A hinged component comprising a polyethylene composition, the polyethylene composition comprising:

(1) about 10 to about 70 wt % of a first ethylene copolymer having a melt index $I_2$, of from 0.1 to 10 g/10 min; a molecular weight distribution $M_w/M_n$, of less than 3.0; and a density of from 0.930 to 0.960 g/cm$^3$; and (2) about 90 to about 30 wt % of a second ethylene copolymer having a melt index $I_2$, of from 50 to 10,000 g/10 min; a molecular weight distribution $M_w/M_n$, of less than 3.0; and a density higher than the density of the first ethylene copolymer, but less than 0.966 g/cm$^3$;

wherein the density of the second ethylene copolymer is less than 0.037 g/cm$^3$ higher than the density of the first ethylene copolymer; the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 1.0; and wherein the polyethylene composition has a molecular weight distribution $M_w/M_n$, of from 2.0 to 7.0; a density of at least 0.949 g/cm$^3$; a melt index, $I_2$ of from greater than 10.0 to 20.0 g/10 min, a Z-average molecular weight $M_z$, of less than 300,000; and a melt flow ratio $I_{21}/I_2$, of from 24 to 38.

Embodiment B

The hinge component of Embodiment A wherein the hinged component has an average hinge life of more than 4200 cycles.

Embodiment C

The hinged component of Embodiment A wherein the hinged component has an average hinge life of at least 4800 cycles.

Embodiment D

The hinged component of Embodiment A, B, or C wherein the polyethylene composition has a Z-average molecular weight $M_Z$, of less than 250,000.

Embodiment E

The hinged component of Embodiment A, B, C, or D wherein the polyethylene composition has a stress exponent of less than 1.40.

Embodiment F

The hinged component of Embodiment A, B, C, D, or E wherein the first and second ethylene copolymers are made by polymerizing ethylene and an alpha olefin in the presence of a single site catalyst.

Embodiment G

The hinged component of Embodiment A, B, C, D, E or F wherein the density of the second ethylene copolymer is less than 0.030 g/cm³ higher than the density of the first ethylene copolymer.

Embodiment H

The hinged component of Embodiment A, B, C, D, E, F or G wherein the first ethylene copolymer has a melt index $I_2$, of from 0.1 to 3.0 g/10 min.

Embodiment I

The hinged component of Embodiment A, B, C, D, E, F, G or H, wherein the second ethylene copolymer has a melt index $I_2$, of from 100 to 5000 g/10 min.

Embodiment J

The hinged component of Embodiment A, B, C, D, E, F, G, H, or I wherein the polyethylene composition has a melt index $I_2$, of from 10.5 to 18.0 g/10 min.

Embodiment K

The hinged component of Embodiment A, B, C, D, E, F, G, H, I or J wherein the polyethylene composition has a bimodal molecular weight distribution as determined by gel permeation chromatography.

Embodiment L

The hinged component of Embodiment A, B, C, D, E, F, G, H, I, J or K wherein the polyethylene composition has a molecular weight distribution $M_w/M_n$, of from 2.5 to 4.5.

Embodiment M

The hinged component of Embodiment A, B, C, D, E, F, G, H, I, J, K or L wherein the first ethylene copolymer has a density of from 0.936 to 0.952 g/cm³.

Embodiment N

The hinged component of Embodiment A, B, C, D, E, F, G, H, I, J, K, L, or M wherein the polyethylene composition has a density of from 0.950 to 0.960 g/cm³.

Embodiment O

The hinged component of Embodiment A, B, C, D, E, F, G, H, I, J, K, L, M, or N wherein the polyethylene composition has no long chain branching.

Embodiment P

The hinged component of Embodiment A, B, C, D, E, F, G, H, I, J, K, L, M, N or O wherein the first and second ethylene copolymers have a $M_w/M_n$ of less than 2.5.

Embodiment Q

The hinged component of Embodiment A, B, C, D, E, F, G, H, I, J, K, L, M, N, O or P wherein the polyethylene composition has a composition distribution breadth index (CDBI(50)) of greater than about 65 wt %.

Embodiment R

The hinged component of Embodiment A, B, C, D, E, F, G, H, I, J, K, L, M, N, O, P or Q wherein the first and second ethylene copolymers each have a composition distribution breadth index (CDBI(50)) of greater than about 65 wt %.

Embodiment S

The hinged component of Embodiment A, B, C, D, E, F, G, H, I, J, K, L, M, N, O, P, Q, or R wherein the polyethylene composition comprises: from about 25 to about 60 wt % of the first ethylene copolymer; and from about 75 to about 40 wt % of the second ethylene copolymer.

Embodiment T

The hinged component of Embodiment A, B, C, D, E, F, G, H, I, J, K, L, M, N, O, P, Q, R or S wherein the polyethylene composition has a comonomer content of less than about 0.5 mol % as determined by $^{13}C$ NMR.

Embodiment U

The hinged component of Embodiment A, B, C, D, E, F, G, H, I, J, K, L, M, N, O, P, Q, R, S or T wherein the polyethylene composition further comprises a nucleating agent or a combination of nucleating agents.

Embodiment V

The hinged component of Embodiment A, B, C, D, E, F, G, H, I, J, K, L, M, N, O, P, Q, R, S, T or U wherein the first and second ethylene copolymers are copolymers of ethylene and 1-octene.

Embodiment W

The hinged component of Embodiment A, B, C, D, E, F, G, H, I, J, K, L, M, N, O, P, Q, R, S, T, U, or V wherein the hinged component is made by compression molding or injection molding.

Embodiment X

The hinged component of Embodiment A, B, C, D, E, F, G, H, I, J, K, L, M, N, O, P, Q, R, S, T, U, V, or W wherein the hinged component is a closure.

Embodiment Y

The hinged component of Embodiment A, B, C, D, E, F, G, H, I, J, K, L, M, N, O, P, Q, R, S, T, U, V, W, or X wherein the polyethylene composition is prepared by contacting ethylene and an alpha-olefin with a single site polymerization catalyst under solution polymerization conditions in a least two polymerization reactors.

Embodiment Z

The hinged component of Embodiment A, B, C, D, E, F, G, H, I, J, K, L, M, N, O, P, Q, R, S, T, U, V, W, X, or Y wherein the second ethylene copolymer has a density of less than 0.965 g/cm$^3$.

Embodiment AA

A process for preparing a hinged component wherein the process comprises at least one compression molding or injection molding step and wherein the hinged component comprises a polyethylene composition, the polyethylene composition comprising:
(1) about 10 to about 70 wt % of a first ethylene copolymer having a melt index I$_2$, of from 0.1 to 10 g/10 min; a molecular weight distribution M$_w$/M$_n$, of less than 3.0; and a density of from 0.930 to 0.960 g/cm$^3$; and
(2) about 90 to about 30 wt % of a second ethylene copolymer having a melt index I$_2$, of from 50 to 10,000 g/10 min; a molecular weight distribution M$_w$/M$_n$, of less than 3.0; and a density higher than the density of the first ethylene copolymer, but less than 0.966 g/cm$^3$; wherein the density of the second ethylene copolymer is less than
0.037 g/cm$^3$ higher than the density of the first ethylene copolymer; the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 1.0; and wherein the polyethylene composition has a molecular weight distribution M$_w$/M$_n$, of from 2.0 to 7.0; a density of at least 0.949 g/cm$^3$; a melt index, I$_2$ of from greater than 10.0 g/10 min to 20.0 g/10 min, a Z-average molecular weight M$_Z$, of less than 300,000; a melt flow ratio I$_{21}$/I$_2$, of from 24 to 38.

Embodiment BB

The process of Embodiment AA wherein the hinge component has an average hinge life of more than 4200 cycles.

The present disclosure has been described with reference to certain details of particular embodiments thereof. It is not intended that such details be regarded as limitations upon the scope of the disclosure except insofar as and to the extent that they are included in the accompanying claims.

What is claimed is:
1. A hinged component comprising a polyethylene composition, the polyethylene composition comprising:
(1) about 10 to about 70 wt % of a first ethylene copolymer having a melt index I$_2$, of from 0.1 to 10 g/10 min; a molecular weight distribution M$_w$/M$_n$, of less than 3.0; and a density of from 0.930 to 0.960 g/cm$^3$; and
(2) about 90 to about 30 wt % of a second ethylene copolymer having a melt index I$_2$, of from 50 to 10,000 g/10 min; a molecular weight distribution M$_w$/M$_n$, of less than 3.0; and a density higher than the density of the first ethylene copolymer, but less than 0.966 g/cm$^3$; wherein the density of the second ethylene copolymer is less than
0.037 g/cm$^3$ higher than the density of the first ethylene copolymer; the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 1.0; and wherein the polyethylene composition has a molecular weight distribution M$_w$/M$_n$, of from 2.0 to 7.0; a density of at least 0.949 g/cm$^3$; a melt index, I$_2$ of from greater than 10.0 to 20.0 g/10 min, a Z-average molecular weight M$_Z$, of less than 300,000; and a melt flow ratio I$_{21}$/I$_2$, of from 24 to 38.

2. The hinged component of claim 1 wherein the hinged component has an average hinge life of more than 4200 cycles in a hinge component life test.

3. The hinged component of claim 1 wherein the hinged component has an average hinge life of at least 4800 cycles in a hinge component life test.

4. The hinged component of claim 1 wherein the polyethylene composition has a Z-average molecular weight M$_Z$, of less than 250,000.

5. The hinged component of claim 1 wherein the polyethylene composition has a stress exponent of less than 1.40.

6. The hinged component of claim 1 wherein the first and second ethylene copolymers are made by polymerizing ethylene and an alpha olefin in the presence of a single site catalyst.

7. The hinged component of claim 1 wherein the density of the second ethylene copolymer is less than 0.030 g/cm$^3$ higher than the density of the first ethylene copolymer.

8. The hinged component of claim 1 wherein the first ethylene copolymer has a melt index I$_2$, of from 0.1 to 3.0 g/10 min.

9. The hinged component of claim 1 wherein the second ethylene copolymer has a melt index I$_2$, of from 100 to 5000 g/10 min.

10. The hinged component of claim 1 wherein the polyethylene composition has a melt index I$_2$, of from 10.5 to 18.0 g/10 min.

11. The hinged component of claim 1 wherein the polyethylene composition has a bimodal molecular weight distribution as determined by gel permeation chromatography.

12. The hinged component of claim 1 wherein the polyethylene composition has a molecular weight distribution M$_w$/M$_n$, of from 2.5 to 4.5.

13. The hinged component of claim 1 wherein the first ethylene copolymer has a density of from 0.936 to 0.952 g/cm$^3$.

14. The hinged component of claim 1 wherein the polyethylene composition has a density of from 0.950 to 0.960 g/cm$^3$.

15. The hinged component of claim 1 wherein the polyethylene composition has no long chain branching.

16. The hinged component of claim 1 wherein the first and second ethylene copolymers have a $M_w/M_n$ of less than 2.5.

17. The hinged component of claim 1 wherein the polyethylene composition has a composition distribution breadth index (CDBI(50)) of greater than about 65 wt %.

18. The hinged component of claim 1 wherein the first and second ethylene copolymers each have a composition distribution breadth index (CDBI(50)) of greater than about 65 wt %.

19. The hinged component of claim 1 wherein the polyethylene composition comprises:
from about 25 to about 60 wt % of the first ethylene copolymer; and
from about 75 to about 40 wt % of the second ethylene copolymer.

20. The hinged component of claim 1 wherein the polyethylene composition has a comonomer content of less than about 0.5 mol % as determined by $^{13}$C NMR.

21. The hinged component of claim 1 wherein the polyethylene composition further comprises a nucleating agent or a combination of nucleating agents.

22. The hinged component of claim 1 wherein the first and second ethylene copolymers are copolymers of ethylene and 1-octene.

23. The hinged component of claim 1 wherein the hinged component is made by compression molding or injection molding.

24. The hinged component of claim 1 wherein the hinged component is a closure.

25. The hinged component of claim 1 wherein the polyethylene composition is prepared by contacting ethylene and an alpha-olefin with a single site polymerization catalyst under solution polymerization conditions in a least two polymerization reactors.

26. The hinged component of claim 1 wherein the second ethylene copolymer has a density of less than 0.965 g/cm$^3$.

27. A process for preparing a hinged component wherein the process comprises at least one compression molding or injection molding step and wherein the hinged component comprises a polyethylene composition, the polyethylene composition comprising:
(1) about 10 to about 70 wt % of a first ethylene copolymer having a melt index $I_2$, of from 0.1 to 10 g/10 min; a molecular weight distribution $M_w/M_n$, of less than 3.0; and a density of from 0.930 to 0.960 g/cm$^3$; and
(2) about 90 to about 30 wt % of a second ethylene copolymer having a melt index $I_2$, of from 50 to 10,000 g/10 min; a molecular weight distribution $M_w/M_n$, of less than 3.0; and a density higher than the density of the first ethylene copolymer, but less than 0.966 g/cm$^3$;
wherein the density of the second ethylene copolymer is less than
0.037 g/cm$^3$ higher than the density of the first ethylene copolymer; the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 1.0; and wherein the polyethylene composition has a molecular weight distribution $M_w/M_n$, of from 2.0 to 7.0; a density of at least 0.949 g/cm$^3$; a melt index, $I_2$ of from greater than 10.0 g/10 min to 20.0 g/10 min, a Z-average molecular weight $M_Z$, of less than 300,000; a melt flow ratio $I_{21}/I_2$, of from 24 to 38.

28. The process of claim 26 wherein the hinged component has an average hinge life of more than 4200 cycles in a hinge component life test.

* * * * *